United States Patent
Kobayashi et al.

(10) Patent No.: US 12,192,627 B2
(45) Date of Patent: Jan. 7, 2025

(54) SIGNAL PROCESSING DEVICE, SIGNAL PROCESSING METHOD, SIGNAL PROCESSING PROGRAM, IMAGING APPARATUS AND LENS APPARATUS

(71) Applicant: FUJIFILM Corporation, Tokyo (JP)

(72) Inventors: Toshiki Kobayashi, Saitama (JP); Yota Akashi, Saitama (JP); Yuya Hirakawa, Saitama (JP); Yuta Watanabe, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 38 days.

(21) Appl. No.: 18/188,301

(22) Filed: Mar. 22, 2023

(65) Prior Publication Data

US 2023/0232104 A1    Jul. 20, 2023

Related U.S. Application Data

(63) Continuation of application No. PCT/JP2021/034508, filed on Sep. 21, 2021.

(30) Foreign Application Priority Data

Sep. 24, 2020    (JP) .................. 2020-159970

(51) Int. Cl.
*H04N 23/68* (2023.01)
*H04N 23/60* (2023.01)
(Continued)

(52) U.S. Cl.
CPC ........... *H04N 23/683* (2023.01); *H04N 23/64* (2023.01); *H04N 23/73* (2023.01); *H04N 23/80* (2023.01)

(58) Field of Classification Search
None
See application file for complete search history.

(56) References Cited

U.S. PATENT DOCUMENTS 5,734,932 A * 3/1998 Washisu ................. G03B 17/00
                                                          396/55
2018/0302539 A1  10/2018 Hirai

FOREIGN PATENT DOCUMENTS

JP    2000-187258 A    7/2000
JP    2005-043780 A    2/2005
(Continued)

OTHER PUBLICATIONS

International Search Report issued in PCT/JP2021/034508; mailed Dec. 7, 2021.
(Continued)

*Primary Examiner* — Mark T Monk
(74) *Attorney, Agent, or Firm* — Studebaker & Brackett PC

(57) ABSTRACT

Provided are a signal processing device, a signal processing method, a signal processing program, an imaging apparatus, and a lens apparatus capable of accurately calculating an amount of blurring on the basis of a signal which is output from a blurring detection sensor. The signal processing device processes a signal which is output from a blurring detection sensor in progress of exposure of an imaging element. The signal processing device includes a processor. The processor is configured to perform processing of generating a second signal obtained by performing high-pass filter processing on a first signal which is output from the blurring detection sensor; and processing of calculating an amount of blurring on the basis of the first signal or the second signal.

12 Claims, 35 Drawing Sheets

(51) Int. Cl.
*H04N 23/73* (2023.01)
*H04N 23/80* (2023.01)

(56) References Cited

FOREIGN PATENT DOCUMENTS

| | | |
|---|---|---|
| JP | 2008-283443 A | 11/2008 |
| JP | 2017-107093 A | 6/2017 |
| JP | 2017-138493 A | 8/2017 |
| JP | 2018-180288 A | 11/2018 |
| JP | 2018-180302 A | 11/2018 |

OTHER PUBLICATIONS

International Preliminary Report on Patentability (Chapter I) and Written Opinion of the International Searching Authority issued in PCT/JP2021/034508; issued Mar. 28, 2023.
An Office Action mailed by the Japanese Patent Office on Jun. 4, 2024, which corresponds to Japanese Application No. 2022-551979 with English translation.
An Office Action; "Notice of Reasons for Refusal," mailed by the Japanese Patent Office on Oct. 30, 2024, which corresponds to Japanese Patent Application No. 2022-551979 and is related to U.S. Appl. No. 18/188,301; with English language translation.

\* cited by examiner

SIGNAL PROCESSING DEVICE, SIGNAL PROCESSING METHOD, SIGNAL PROCESSING PROGRAM, IMAGING APPARATUS AND LENS APPARATUS

CROSS-REFERENCE TO RELATED APPLICATIONS

The present application is a Continuation of PCT International Application No. PCT/JP2021/034508 filed on Sep. 21, 2021 claiming priority under 35 U.S.C § 119(a) to Japanese Patent Application No. 2020-159970 filed on Sep. 24, 2020. Each of the above applications is hereby expressly incorporated by reference, in its entirety, into the present application.

BACKGROUND OF THE INVENTION

1. Field of the Invention

The present invention relates to a signal processing device, a signal processing method, a signal processing program, an imaging apparatus, and a lens apparatus, and in particular, a signal processing device that processes a signal which is output from a blurring detection sensor, a signal processing method, a signal processing program, an imaging apparatus, and a lens apparatus.

2. Description of the Related Art

The camera shake correction technique of the imaging apparatus consists of a technique of detecting camera shake and a technique of correcting the camera shake. As a technique for detecting the camera shake, a technique for detecting camera shake using a blurring detection sensor such as a gyro sensor is known (for example, JP2008-283443A, JP2017-107093A, and the like).

SUMMARY OF THE INVENTION

An embodiment according to the technique of the present disclosure provides a signal processing device, a signal processing method, a signal processing program, an imaging apparatus, and a lens apparatus capable of accurately calculating an amount of blurring on the basis of a signal which is output from a blurring detection sensor.

(1) A signal processing device that processes a signal which is output from a blurring detection sensor in progress of exposure of an imaging element, the signal processing device comprising a processor, in which the processor is configured to perform: processing of generating a second signal obtained by performing high-pass filter processing on a first signal which is output from the blurring detection sensor; and processing of calculating an amount of blurring on the basis of the first signal or the second signal.

(2) The signal processing device according to (1), in which in the calculation of the amount of blurring, the processor switches a signal, which is used for calculating the amount of blurring, on the basis of an exposure time of the imaging element and an elapsed time for calculation in the high-pass filter processing.

(3) The signal processing device according to (2), in which in the calculation of the amount of blurring based on the second signal, in a case where the calculation of the high-pass filter processing is reset, the processor switches from the second signal to the first signal and calculates the amount of blurring.

(4) The signal processing device according to (2) or (3), in which in a case where the exposure time is greater than a first threshold value and the elapsed time for calculation is equal to or less than a second threshold value, the processor calculates the amount of blurring on the basis of the first signal during a period from start of the exposure to a third threshold value, and the amount of blurring is calculated on the basis of the second signal after elapse of the period from the start of the exposure to the third threshold value.

(5) The signal processing device according to any one of (2) to (4), in which in a case where the exposure time is equal to or less than a first threshold value, the processor calculates the amount of blurring on the basis of the first signal.

(6) The signal processing device according to any one of (2) to (5), in which in a case where the exposure time is greater than a first threshold value and the elapsed time for calculation is greater than a second threshold value, the processor calculates the amount of blurring on the basis of the second signal.

(7) The signal processing device according to (4), in which the first threshold value, the second threshold value, and the third threshold value are set on the basis of a cut-off frequency in the high-pass filter processing and an offset of the blurring detection sensor.

(8) The signal processing device according to (7), in which the processor further performs processing of calculating the offset on the basis of a signal which is output from the blurring detection sensor.

(9) The signal processing device according to (8), in which the processor is configured to perform: in the calculation of the offset, processing of obtaining a direct current component of a signal which is output from the blurring detection sensor and calculating a first feature amount; processing of obtaining a gradient of an accumulated integral value of a signal which is output from the blurring detection sensor and calculating a second feature amount; and processing of calculating the offset on the basis of the first feature amount and the second feature amount.

(10) An imaging apparatus comprising: a blurring detection sensor that is provided in an apparatus body; and the signal processing device according to any one of (1) to (9) that processes a signal which is output from the blurring detection sensor.

(11) A lens apparatus comprising: a blurring detection sensor that is provided in an apparatus body; and the signal processing device according to any one of (1) to (9) that processes a signal which is output from the blurring detection sensor.

(12) A signal processing method for processing a signal which is output from a blurring detection sensor in progress of exposure of an imaging element, the signal processing method comprising: processing of generating a second signal obtained by performing high-pass filter processing on a first signal which is output from the blurring detection sensor; and processing of calculating an amount of blurring on the basis of the first signal or the second signal.

(13): A signal processing program that causes a computer to execute: processing of acquiring a signal which is output from a blurring detection sensor in progress of exposure of an imaging element; processing of generating a second signal obtained by performing high-pass filter processing on a first signal which is output from the blurring detection sensor; and processing of calculating an amount of blurring on the basis of the first signal or the second signal.

DESCRIPTION OF THE PREFERRED EMBODIMENTS

Hereinafter, preferred embodiments of the present invention will be described in detail with reference to the accompanying drawings.

Here, a case where the present invention is applied to a digital camera having a function of detecting camera shake with a gyro sensor and optically correcting the camera shake will be described as an example. The digital camera is an example of an imaging apparatus. The gyro sensor is an example of a blurring detection sensor.

In a case where camera shake is detected by a gyro sensor, the amount of blurring (amount of blurring in angle) is calculated by integrating an output signal (angular velocity signal) of the gyro sensor. However, in the output signal of the gyro sensor, there is an error called an offset. The offset is a reference value shift (zero point shift) in which the output signal is not 0 even in a state where the angular velocity is 0 [deg/s]. In a case where the amount of blurring is calculated in a state where the offset is included therein, an error occurs and accurate correction cannot be performed. For this reason, in a general imaging apparatus, high-pass filter processing is performed on the output signal of the gyro sensor, thereby reducing the effect of the offset.

However, in a case where the amount of blurring is calculated by performing the high-pass filter processing on the output signal of the gyro sensor, there is a problem that a low-frequency blurring residue is generated. Consequently, in order to achieve more accurate camera shake correction, it is necessary to perform the correction without using the high-pass filter.

[Configuration of Digital Camera]

Figure 1:
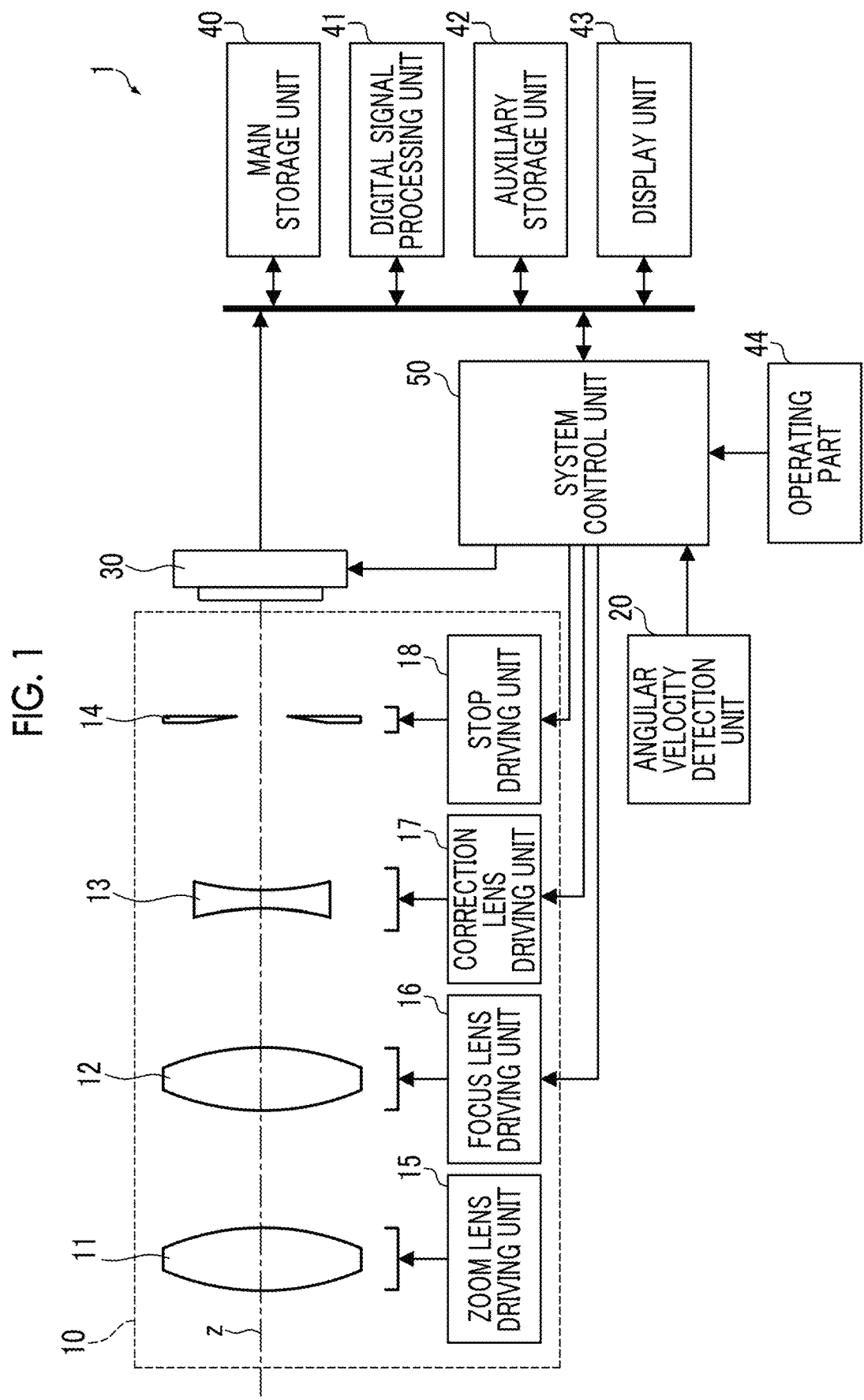
FIG. 1 is a block diagram showing a schematic configuration of a digital camera.

FIG. 1 is a block diagram showing a schematic configuration of the digital camera.

The digital camera 1 according to the present embodiment is a digital camera which is provided with a so-called lens shift type camera shake correction function. The lens shift type camera shake correction mechanism corrects camera shake by moving a correction lens provided in an imaging optical system.

As shown in FIG. 1, the digital camera 1 comprises an imaging optical system 10, an angular velocity detection unit 20, an imaging element 30, a main storage unit 40, a digital signal processing unit 41, an auxiliary storage unit 42, a display unit 43, an operating part 44, a system control unit 50, and the like.

The imaging optical system 10 is configured to include a zoom lens 11, a focus lens 12, a correction lens 13, and a stop 14.

The zoom lens 11 is a lens for adjusting a focal length. The imaging optical system 10 adjusts the focal length by moving the zoom lens 11 back and forth along an optical axis. The zoom lens 11 is operated by being driven by the zoom lens driving unit 15.

The focus lens 12 is a lens for adjusting the focal length. The imaging optical system 10 adjusts the focal length by moving the focus lens 12 back and forth along the optical axis. The focus lens 12 is operated by being driven by the focus lens driving unit 16.

The correction lens 13 is a lens for correcting camera shake. The correction lens 13 moves in a plane orthogonal to the optical axis to correct camera shake.

Figure 2:
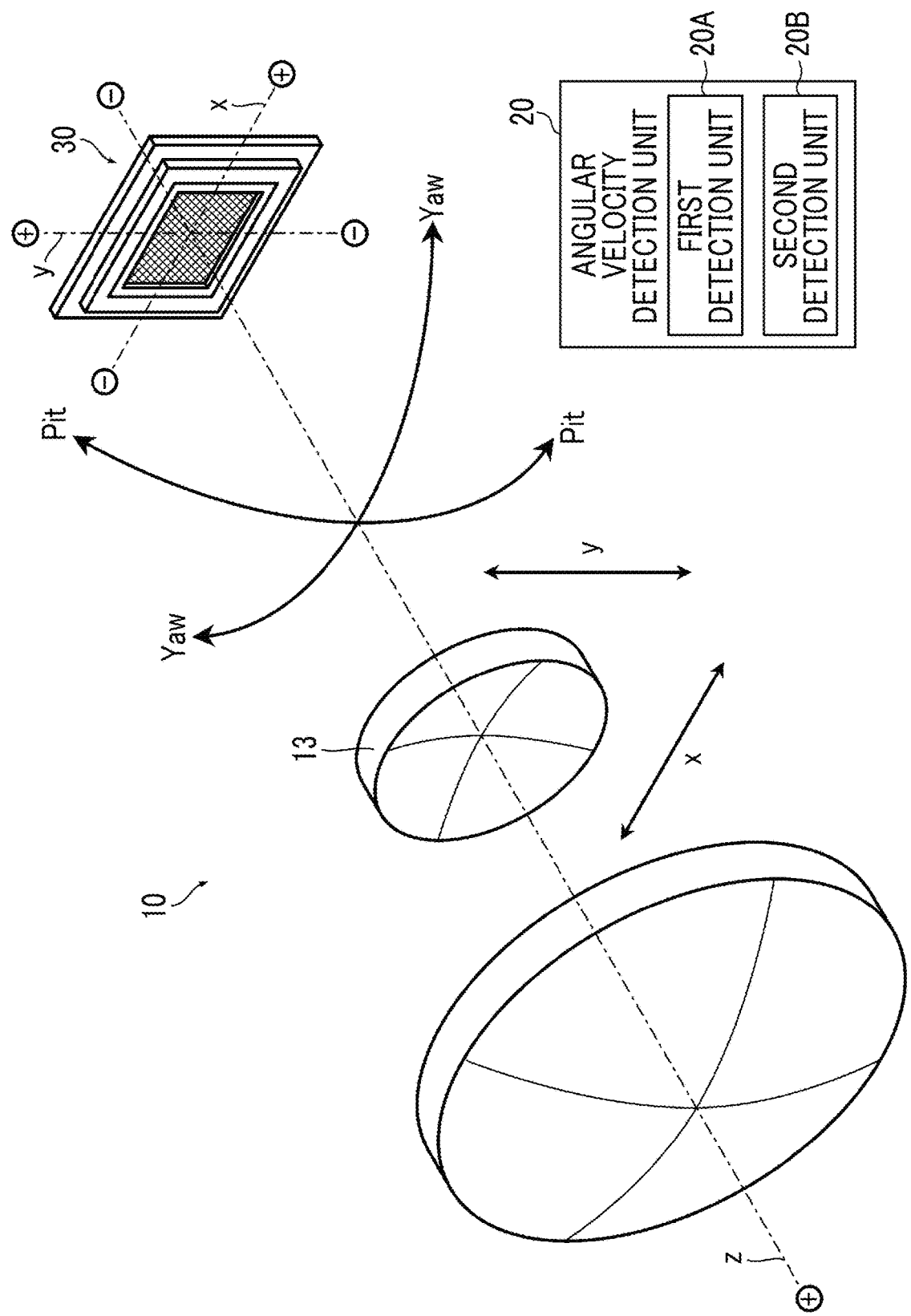
FIG. 2 is a conceptual diagram of movement of a correction lens.

FIG. 2 is a conceptual diagram of movement of the correction lens.

The optical axis is the z axis, the axis orthogonal to the z axis is the x axis, and the axes orthogonal to the z axis and the x axis are the y axis. The x axis is an axis in the horizontal direction (lateral direction). The y axis is an axis in the vertical direction (longitudinal direction). The correction lens 13 moves along a plane (xy plane) defined by the x axis and the y axis. This plane (xy plane) is a plane parallel to the light-receiving surface of the imaging element 30.

In a case of correcting camera shake, the correction lens 13 is moved in a direction of offsetting blurring. The correction lens 13 is operated by being driven by a correction lens driving unit 17.

Figure 3:
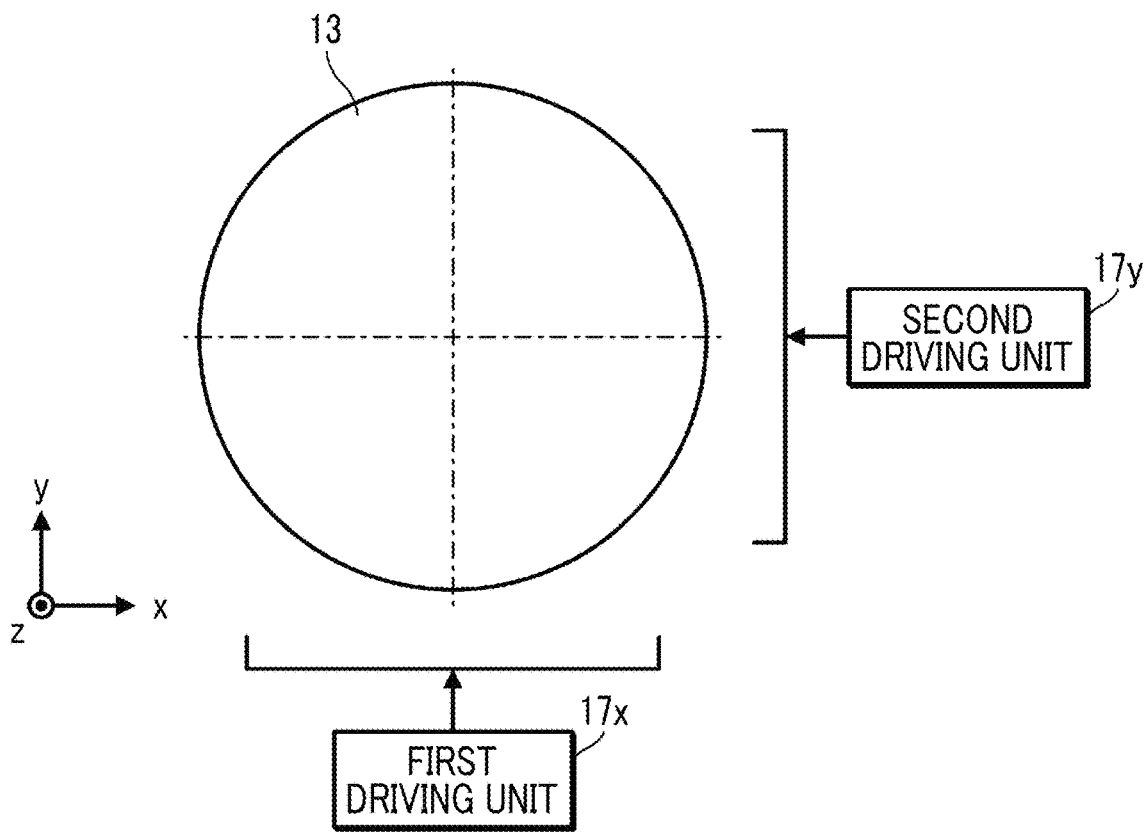
FIG. 3 is a diagram showing a schematic configuration of a correction lens driving unit.

FIG. 3 is a diagram showing a schematic configuration of the correction lens driving unit.

The correction lens driving unit 17 includes a first driving unit 17x and a second driving unit 17y. The first driving unit 17x moves the correction lens 13 along the x axis. The second driving unit 17y moves the correction lens 13 along the y axis.

The stop 14 is composed of, for example, an iris stop. An amount of light passing through the imaging optical system 10 is adjusted by the stop 14. The stop 14 is operated by being driven by the stop driving unit 18.

As shown in FIG. 2, the angular velocity detection unit 20 includes a first detection unit 20A and a second detection unit 20B. The first detection unit 20A detects an angular velocity of a digital camera body (apparatus body) in a yaw direction Yaw. The second detection unit 20B detects the angular velocity of the digital camera body in a pitch direction Pit.

Here, the yaw direction Yaw is a rotation direction about the y axis, as shown in FIG. 2. The yaw direction Yaw is a rotation direction in the horizontal direction (lateral direction) of the digital camera body.

Further, as shown in FIG. 2, the pitch direction Pit is a rotation direction about the x axis. The pitch direction Pit is a rotation direction in the vertical direction (longitudinal direction) of the digital camera body.

Figure 4:
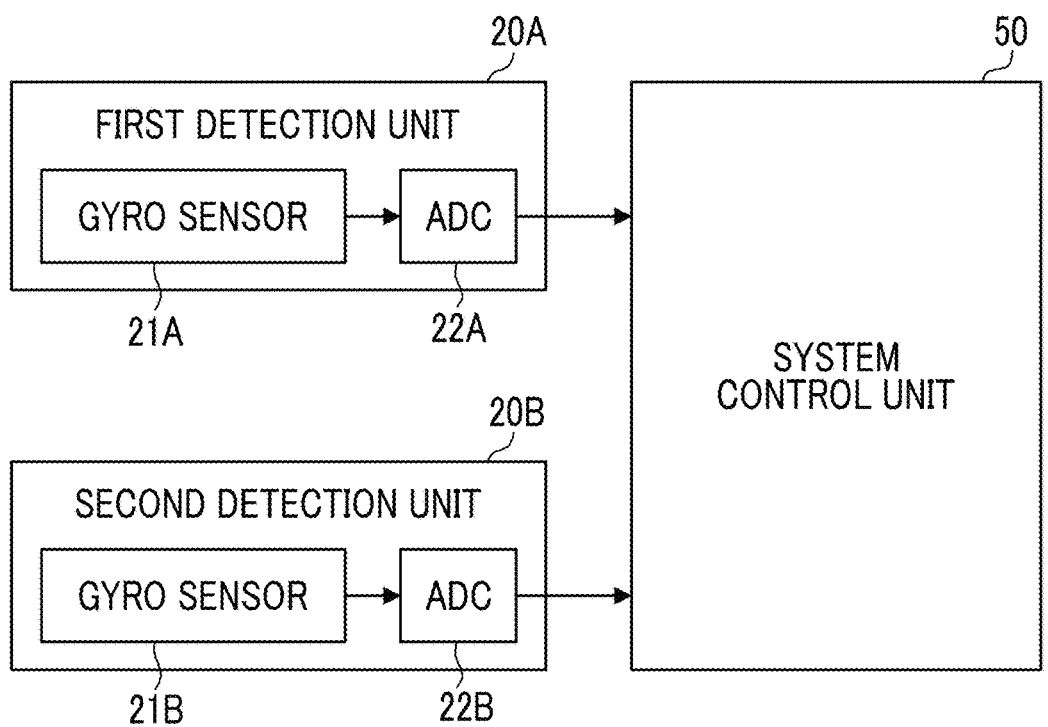
FIG. 4 is a diagram showing a schematic configuration of a first detection unit and a second detection unit.

FIG. 4 is a diagram showing a schematic configuration of the first detection unit and the second detection unit.

The first detection unit 20A and the second detection unit 20B are configured to include both gyro sensors 21A and 21B and analog to digital converters (ADC) 22A and 22B. The signals (angular velocity signals) which are output from the gyro sensors 21A and 21B are converted into digital signals by the ADCs 22A and 22B and incorporated into the system control unit 50.

The imaging element 30 is composed of, for example, a complementary metal-oxide semiconductor (CMOS) type image sensor having a predetermined color filter array (for example, a Bayer array or the like). In the digital camera 1 of the present embodiment, the imaging element 30 is configured to include a driving unit, an analog to digital converter (ADC), a signal processing unit, and the like. In such a case, the imaging element 30 is operated by being driven by a built-in driving unit. Further, the signal of each pixel is converted into a digital signal by the built-in ADC. Furthermore, the signal of each pixel is subjected to processing such as correlation double sampling processing, gain processing, and correction processing by a built-in signal processing unit as necessary. The signal processing may be performed on an analog signal of each pixel or may be performed on a digital signal of each pixel.

In addition to the CMOS type image sensor, the imaging element 30 may also be configured with an organic thin film imaging element, an XY address type image sensor, a charged coupled device (CCD) type image sensor, or the like.

The main storage unit 40 is used as a transitory storage region for data. A signal (image signal) which is output from the imaging element 30 is stored in the main storage unit 40 for each frame. The main storage unit 40 is composed of, for example, a semiconductor memory.

The digital signal processing unit 41 generates image data by performing signal processing such as offset processing, gamma correction processing, demosaic processing, and RGB/YCrCb conversion processing on the image signal obtained by imaging. The digital signal processing unit 41 is composed of, for example, a microprocessor.

The auxiliary storage unit 42 functions as a storage unit for various types of data. The auxiliary storage unit 42 is composed of, for example, a non-volatile semiconductor memory such as an electrically erasable programmable read only memory (EEPROM) and a flash memory. The data recorded in the auxiliary storage unit 42 includes image data which is obtained by imaging and data necessary for control.

The display unit 43 is used as a monitor for reproduction in a case of reproducing a captured image, and is used as a monitor for live view by displaying a live view image during imaging. Further, the display unit 43 is used as a monitor for setting in a case where various settings are made. The display unit 43 is composed of, for example, a display such as a liquid crystal display (LCD) or an organic light emitting diode (OLED).

The operating part 44 is configured to include various operating members for operating the digital camera 1. The operating member includes various operation buttons in addition to a power button and a shutter button. The various kinds of operation buttons include buttons for turning on and off the camera shake correction function. Further, in a case where the display unit 43 is composed of a display unit with a touch panel mounted thereon, the operating member constituting the operating part 44 includes the touch panel. The operating part 44 outputs a signal corresponding to the operation of each operating member to the system control unit 50.

The system control unit 50 controls the entire digital camera 1 in an integrated manner. Further, the system control unit 50 calculates various physical quantities required for control. The system control unit 50 is composed of, for example, a microcomputer which comprises a processor, a memory, and the like. The processor is composed of, for example, a central processing unit (CPU) or the like. The memory is composed of, for example, a random access memory (RAM), a read only memory (ROM), or the like. The memory stores a program executed by the processor (for example, a signal processing program or the like) and various types of data. The control which is performed by the system control unit 50 includes control of camera shake correction.

[System Configuration for Camera Shake Correction Control]

Figure 5:
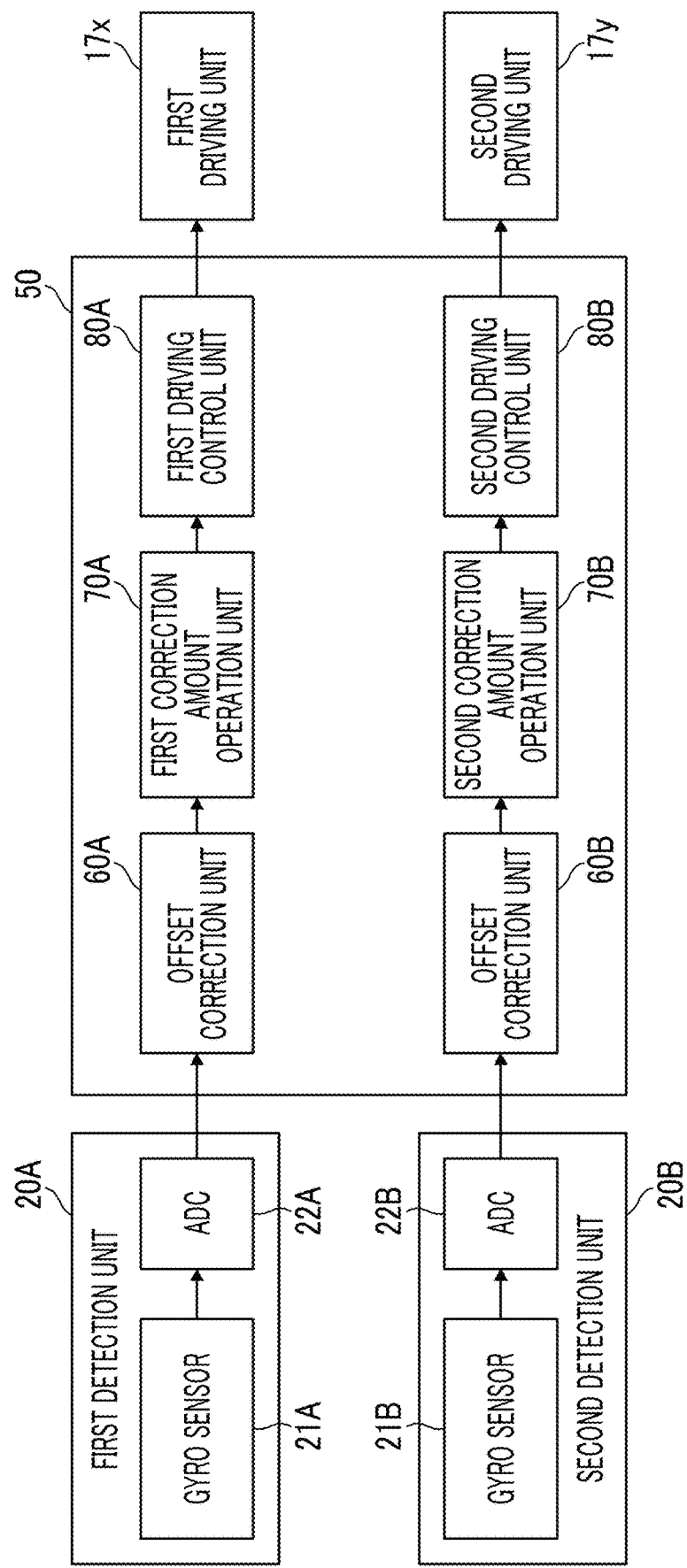
FIG. 5 is a block diagram of functions implemented by a system control unit with respect to control of camera shake correction.

FIG. 5 is a block diagram of functions implemented by the system control unit with respect to the control of camera shake correction.

As shown in the drawing, regarding control of camera shake correction, the system control unit 50 functions as offset correction units 60A and 60B, a first correction amount operation unit 70A, a second correction amount operation unit 70B, a first driving control unit 80A, a second driving control unit 80B, and the like. The functions are implemented by the processor constituting the system control unit 50 executing a predetermined control program.

The offset correction unit 60A performs processing of removing an offset from a signal (an angular velocity signal in the yaw direction) output from the first detection unit 20A on the basis of the offset information stored in the offset storage unit (not shown in the drawing). The offset correction unit 60B performs processing of removing an offset from a signal (an angular velocity signal in the pitch direction) output from the second detection unit 20B on the basis of the offset information stored in the offset storage unit (not shown in the drawing). The offset storage unit may be composed of, for example, the auxiliary storage unit 42 or a memory having a required capacity inside the offset correction unit.

The first correction amount operation unit 70A calculates a correction amount in the x axis direction of the correction lens 13 on the basis of an angular velocity signal in the yaw direction after the offset correction unit 60A removes the offset. That is, an amount of movement of the correction lens 13 in the x axis direction for correcting blurring in the yaw direction is calculated.

Figure 6:
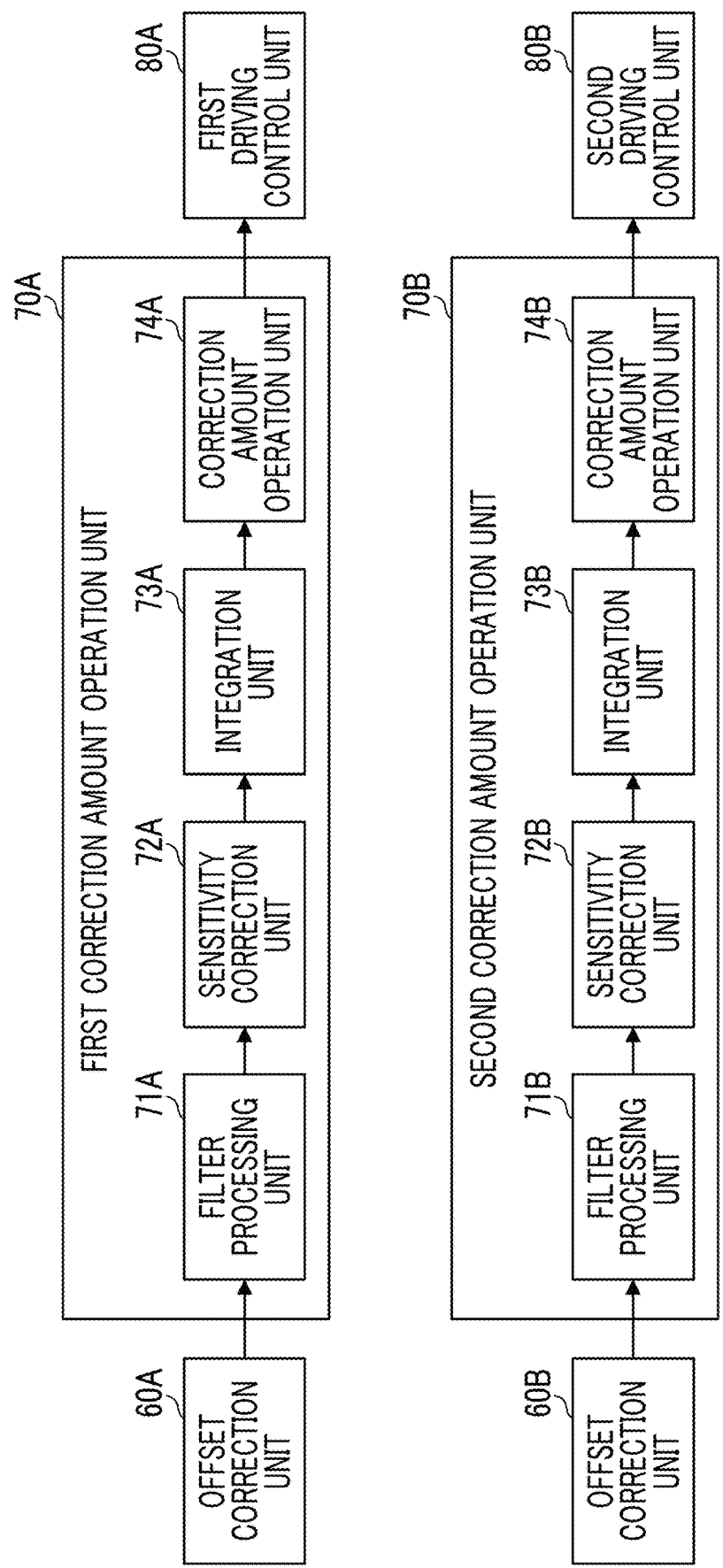
FIG. 6 is a block diagram of functions of a first correction amount operation unit and a second correction amount calculation processing unit.

FIG. 6 is a block diagram of functions of the first correction amount operation unit and the second correction amount calculation processing unit.

As shown in the drawing, the first correction amount operation unit 70A has functions of a filter processing unit 71A, a sensitivity correction unit 72A, an integration unit 73A, and a correction amount operation unit 74A. In the present embodiment, the system control unit 50, which functions as the first correction amount operation unit 70A and the second correction amount operation unit 70B, is an example of the signal processing device.

The filter processing unit 71A generates a signal, which is subjected to high-pass filter processing, with respect to the angular velocity signal in the yaw direction after the offset is removed. Further, the filter processing unit 71A selectively switches and outputs a signal, which is not subjected to the high-pass filter processing (first signal), and a signal, which is subjected to the high-pass filter processing (second signal), in accordance with predetermined conditions. Details of the switching conditions and the switching processing will be described later.

The sensitivity correction unit 72A performs processing of multiplying the signal which is output from the filter processing unit 71A (the angular velocity signal subjected to the high-pass filter processing or the angular velocity signal not subjected to the high-pass filter processing) by the sensitivity. The sensitivity is a unitless coefficient which is uniquely determined with a position of the focus lens and a focal length (position of the zoom lens) set as variables. Consequently, in a case where the focus lens position and the focal length change from moment to moment, the sensitivity also changes from moment to moment.

The integration unit 73A performs processing of integrating the angular velocity signal after the sensitivity is corrected by the sensitivity correction unit 72A. Thereby, the amount of blurring in the yaw direction is calculated.

The correction amount operation unit 74A calculates the correction amount in the x axis direction of the correction lens 13 on the basis of the amount of blurring in the yaw direction calculated by the integration unit 73A. That is, the amount of movement of the correction lens 13 in the x axis direction required to offset the blurring in the yaw direction is calculated.

The second correction amount operation unit 70B calculates the correction amount of the correction lens 13 in the y axis direction on the basis of the angular velocity signal in the pitch direction after the offset correction unit 60B removes the offset. That is, the amount of movement of the correction lens 13 in the y axis direction, which is necessary for offsetting the blurring in the pitch direction, is calculated. A function of the second correction amount operation unit 70B is the same as a function of the first correction amount operation unit 70A. As shown in FIG. 6, the second correction amount operation unit 70B has functions of a filter processing unit 71B, a sensitivity correction unit 72B, an integration unit 73B, and a correction amount operation unit 74B. Details of the functions will not be described.

The first driving control unit 80A controls driving of the first driving unit 17x to control the movement of the correction lens 13 in the x axis direction. The first driving control unit 80A controls driving of the first driving unit 17x on the basis of the correction amount in the x axis direction of the correction lens 13 calculated by the first correction amount operation unit 70A.

The second driving control unit 80B controls driving of the second driving unit 17y to control the movement of the correction lens 13 in the y axis direction. The second driving control unit 80B controls driving of the second driving unit 17y on the basis of the correction amount in the y axis direction of the correction lens 13 calculated by the second correction amount operation unit 70B.

The control of camera shake correction is executed in the following procedure. First, the offset correction unit 60A and the offset correction unit 60B perform processing of removing the offset of the signals (angular velocity signals) output from the first detection unit 20A and the second detection unit 20B. Next, on the basis of the signal from which the offset is removed, the first correction amount operation unit 70A and the second correction amount operation unit 70B calculate the correction amount of the correction lens 13 in the x axis direction and the y axis direction. Next, the first driving control unit 80A and the second driving control unit 80B drive the first driving unit 17x and the second driving unit 17y on the basis of the calculated correction amount. Thereby, the correction lens 13 is moved so as to offset the blurring, and the camera shake is corrected.

[Filter Processing Unit]
[Configuration of Filter Processing Unit]

Hereinafter, the functions of the filter processing units 71A and 71B provided in the first correction amount operation unit 70A and the second correction amount operation unit 70B will be described. The function of the filter processing unit 71A provided in the first correction amount operation unit 70A is the same as the function of the filter processing unit 71B provided in the second correction amount operation unit 70B. Consequently, the function of the filter processing unit 71A provided in the first correction amount operation unit 70A will be described here, and the function of the filter processing unit 71B provided in the second correction amount operation unit 70B will not be described.

Figure 7:
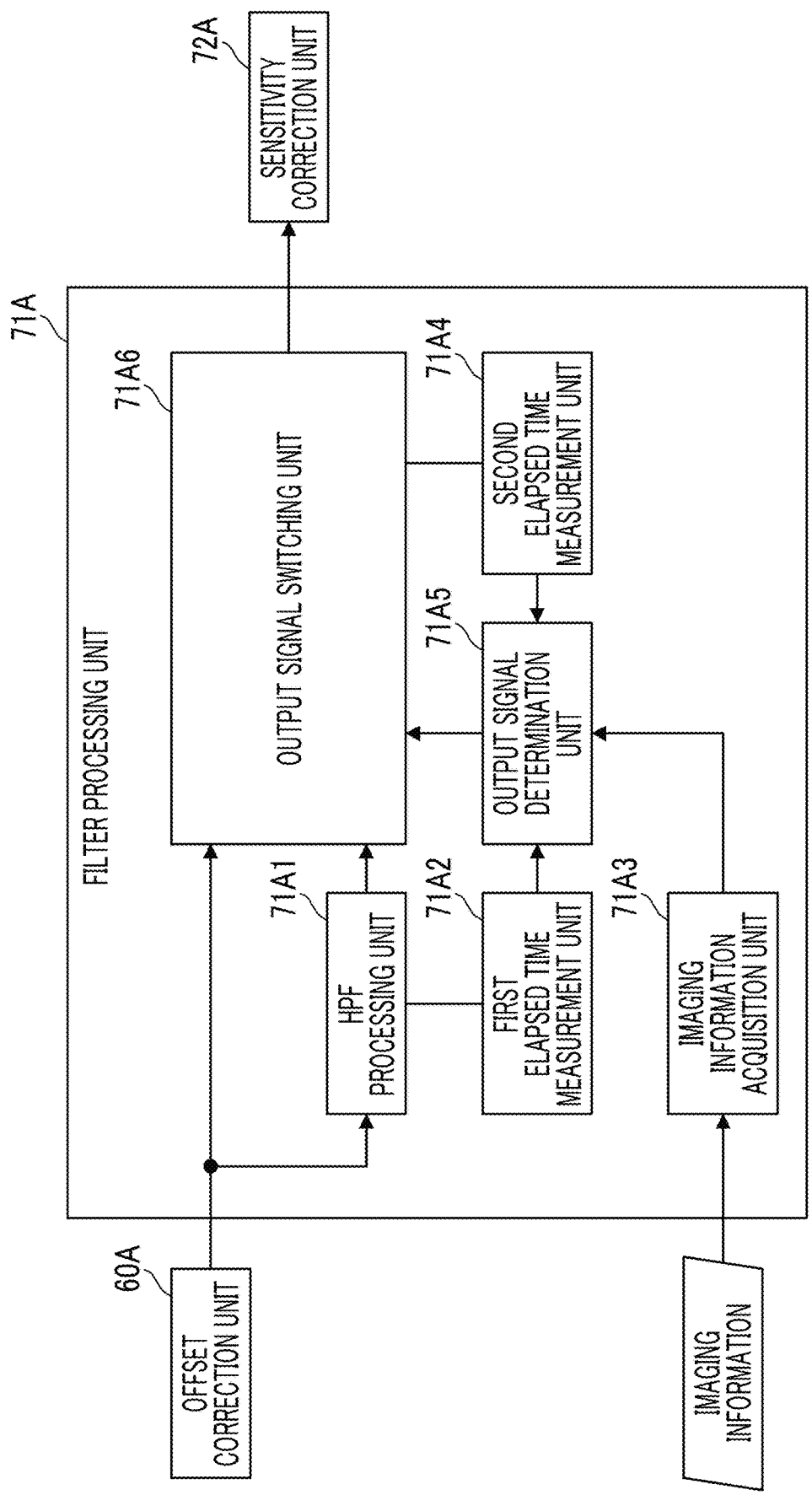
FIG. 7 is a block diagram of a function of a filter processing unit of a first correction amount calculation processing unit.

FIG. 7 is a block diagram of the function of the filter processing unit of the first correction amount calculation processing unit.

As shown in the drawing, the filter processing unit 71A has functions of a high-pass filter (HPF) processing unit 71A1, a first elapsed time measurement unit 71A2, an imaging information acquisition unit 71A3, a second elapsed time measurement unit 71A4, an output signal determination unit 71A5, and an output signal switching unit 71A6. The functions are implemented by a processor constituting the system control unit 50 executing a predetermined program (signal processing program).

As the high-pass filter processing unit 71A1, generates a signal (second signal), which is subjected to high-pass filter processing, with respect to the angular velocity signal (first signal) in the yaw direction after the offset is removed.

The following expression is an example of the calculation of the high-pass filter processing which is performed by the high-pass filter processing unit 71A1. It is assumed that a signal value (angular velocity value) of the angular velocity signal which is input to the high-pass filter processing unit 71A1 is w, and a signal value of the angular velocity signal which is output from the high-pass filter processing unit 71A1 in a case where the cut-off frequency is n is HPFn. The HPFn is calculated by the following expression.

$$HPFn[k] = \omega[k] \times HPFn\_COEF\_A - \omega[k-1] \times HPFn\_COEF\_A + HPFn[k-1] \times HPFn\_COEF\_B$$

Here, HPFn_COEF_A and HPFn_COEF_B are filter coefficients in a case where the cut-off frequency is n.

In addition, assuming that the signal which is not subjected to the high-pass filter processing is HPF_LESS, HPF_LESS is calculated by the following expression.

$$HPF\_LESS[k] = \omega[k]$$

The first elapsed time measurement unit 71A2 measures an elapsed time for calculation in the high-pass filter processing in the high-pass filter processing unit 71A1 as the first elapsed time. The elapsed time for calculation in the high-pass filter processing means the elapsed time from the start of the calculation of the high-pass filter processing. In the high-pass filter processing, the calculation thereof may be reset. In a case where the calculation of the high-pass filter processing is reset, measurement of the elapsed time is also reset. Therefore, in a case where the calculation of the high-pass filter processing is reset, an elapsed time from the start of the calculation again after the reset is measured as the first elapsed time. The information of the first elapsed time (elapsed time for calculation in the high-pass filter processing), which is measured by the first elapsed time measurement unit 71A2, is output to the output signal determination unit 71A5.

The imaging information acquisition unit 71A3 acquires the imaging information. The imaging information includes information about the primary imaging and information about the exposure time during the primary imaging. The "primary imaging" is an imaging for recording. The information of the primary imaging includes information about the start of the primary imaging and information about the end thereof. In the digital camera 1 according to the present embodiment, the primary imaging is executed by fully pressing a shutter button. The digital camera 1 performs preparation for imaging through half-pressing of the shutter button (S1 ON), and performs imaging for recording through full pressing of the shutter button (S2 ON). In the preparation for imaging, automatic exposure (AE) and auto-focus (AF) are performed. The AE determines an exposure condition during the primary imaging. Further, the AF brings a main subject into focus. Since such processing is a known technique, details thereof will not be described. The imaging information acquisition unit 71A3 acquires the exposure time (shutter speed) information which is obtained by the AE, and acquires the information of the exposure time during the primary imaging. The imaging information acquisition unit 71A3 outputs the acquired imaging information to the output signal determination unit 71A5.

In a case where the second elapsed time measurement unit 71A4 outputs a signal which is not subjected to the high-pass filter processing in progress of the exposure in the primary imaging, the second elapsed time measurement unit 71A4 measures the elapsed time from the start of the output of the signal as a second elapsed time. The information about the second elapsed time, which is measured by the second elapsed time measurement unit 71A4 (information about the elapsed time after the output of the signal not subjected to the high-pass filter processing is started), is output to the output signal determination unit 71A5.

The output signal determination unit 71A5 determines whether to output, from filters processing unit 71A, either a signal which is not subjected to high-pass filter processing (hereinafter, referred to as a non-high-pass signal) or a signal which is subjected to high-pass filter processing (hereinafter, referred to as a high-pass signal). The output signal determination unit 71A5 determines the signal to be output, on the basis of information about the first elapsed time (elapsed time for calculation in the high-pass filter processing) which is output from the first elapsed time measurement unit 71A2, imaging information which is output from the imaging information acquisition unit 71A3, and information of the second elapsed time (the elapsed time from the start of the output of the non-high-pass signal) output from the second elapsed time measurement unit 71A4. Specifically, the high-pass signal is output in the rest of a period where the exposure in the primary imaging is in progress. On the other hand, in progress of the exposure in the primary imaging, the high-pass syllabary signal or the non-high-pass signal is selectively output. Hereinafter, a method of determining a signal to be output from the filter processing unit 71A in progress of the exposure in the primary imaging will be described. It should be noted that whether or not the exposure in the primary imaging is in progress is determined on the basis of the imaging information acquired by the imaging information acquisition unit 71A3. That is, it is determined whether or not the exposure in the primary imaging is in progress on the basis of the information about the start and the end of the primary imaging included in the imaging information. The period from the start to the end of the primary imaging is defined as the period where the exposure in the primary imaging is in progress, and the rest of the period is defined as the period where the exposure in the primary imaging is not in progress.

Figure 8:
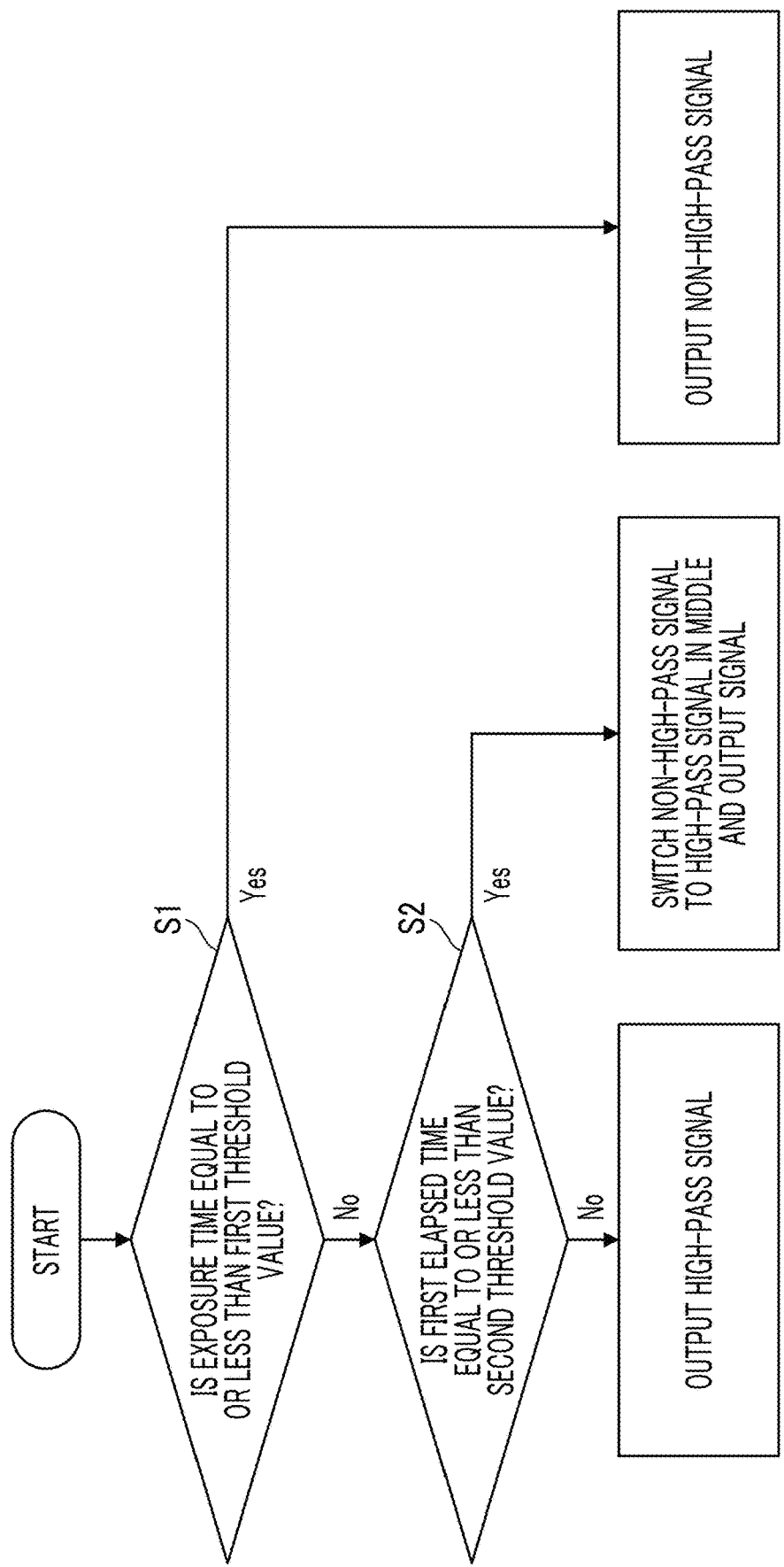
FIG. 8 is a conceptual diagram of a method of determining a signal to be output from the filter processing unit in progress of exposure in primary imaging.

FIG. 8 is a conceptual diagram of a method of determining the signal to be output from the filter processing unit in progress of exposure in primary imaging.

During the primary imaging, the signal to be output from the filter processing unit 71A in progress of the exposure is determined on the basis of the exposure time and the first elapsed time (elapsed time for calculation of the high-pass filter processing).

In a case where the exposure time is equal to or less than a first threshold value (in a case where "Yes" in step S1 in FIG. 8), the signal to be output from the filter processing unit 71A in progress of the exposure in the primary imaging is regarded as a non-high-pass signal regardless of the first elapsed time. In such a case, the elapsed time for calculation (first elapsed time) of the high-pass filter processing does not matter.

The case where the exposure time is equal to or less than the first threshold value means that the exposure time is relatively short. In a case where the exposure time is short, a non-high-pass signal is output in progress of the exposure. Thereby, even low-frequency blurring can be appropriately detected.

In a case where the exposure time is greater than the first threshold value and the first elapsed time is greater than a second threshold value (in a case where step S2 in FIG. 8 is "Yes"), the signal to be output from the filter processing unit 71A in progress of the exposure is regarded as a high-pass signal.

The case where the exposure time is greater than the first threshold value is a case where the exposure time is relatively long. In such a case, in a case where the amount of blurring is calculated on the basis of the non-high-pass signal, an error may occur due to the effect of the offset. Therefore, in a case where the exposure time is long, by calculating the amount of blurring on the basis of the high-pass signal, the amount of blurring can be calculated without being affected by the offset. However, in a case where a sufficient time has not elapsed after the calculation of the high-pass filter processing is started, a value of the high-pass signal is not stable, which causes an error. Consequently, the high-pass signal is output only in a case where a sufficient time has elapsed after the calculation of the high-pass filter processing was started.

In addition, for the above-mentioned purpose, the second threshold value is set to a value necessary and sufficient for the high-pass signal to be stable. That is, in a case where the exposure time is greater than the second threshold value, a time at which the high-pass signal is considered to be stable is set. Regarding the second threshold value, for example, an optimum value can be obtained through an experiment or a simulation. For the experiments and simulations, for example, a method of obtaining the optimum value by changing the offset and the cut-off frequency of the high-pass filter processing can be adopted.

Further, the first threshold value is set to a time at which the effect of the offset can be dominantly received in a case where the exposure time is greater than the first threshold value. In other words, in a case where the exposure time is less than the first threshold value, the time is set such that the effect of the offset can be ignored. For the first threshold value, for example, the optimum value can be obtained by an experiment or a simulation. For the experiments and simulations, for example, a method of obtaining the optimum value by changing the offset and the cut-off frequency of the high-pass filter processing can be adopted.

In a case where the exposure time is greater than the first threshold value and the first elapsed time is equal to or less than the second threshold value (in a case where step S2 in FIG. 8 is "No"), the signals to be output from the filter processing unit 71A in progress of the exposure are regarded as non-high-pass and high-pass signals. More specifically, first, a non-high-pass signal is output, and then switched to a high-pass signal in the middle of the output.

As described above, in a case where the exposure time is long, an error may occur in the calculated amount of blurring due to the effect of the offset. On the other hand, in order to achieve more accurate camera shake correction, it is necessary to calculate the amount of blurring on the basis of the non-high-pass signal. Therefore, even in a case where the exposure time is greater than the first threshold value, in a case where the first elapsed time is equal to or less than the second threshold value, the non-high-pass signal is switched to the high-pass signal and the signal is output. Thereby, on the other hand, more accurate camera shake correction can be achieved.

The timing of switching from the non-high-pass signal to the high-pass signal is determined in advance. The switching timing is defined by the elapsed time from the start of output of the non-high-pass signal. In a case where the elapsed time from the start of the output of the non-high-pass signal is greater than a third threshold value, the non-high-pass signal is switched to the high-pass signal. As described above, the elapsed time from the start of the output of the non-high-pass signal is measured as the second elapsed time. Therefore, in a case where the second elapsed time is greater than the third threshold value, the non-high-pass signal is switched to the high-pass signal. In addition, since the processing is performed in progress of the exposure, the elapsed time (second elapsed time) from the start of the output of the non-high-pass signal is the same as the elapsed time from the start of the exposure.

Regarding the third threshold value, for example, the optimum value can be obtained by an experiment or a simulation. For the experiments and simulations, for example, a method of obtaining the optimum value by changing the offset and the cut-off frequency of the high-pass filter processing can be adopted.

Incidentally, the calculation of the high-pass filter processing may be reset in progress of the exposure. As described above, the high-pass signal is not stable until a sufficient time has elapsed from the start of the calculation thereof. For this reason, in a case where the high-pass signal is continuously output even after the calculation is reset, an error occurs in the calculated amount of blurring.

Therefore, in the digital camera 1 of the present embodiment, in a case where the calculation of the high-pass filter processing is reset in progress of the exposure, the signal to be output is forcibly switched from the high-pass signal to the non-high-pass signal.

The output signal determination unit 71A5 determines, for example, whether or not reset is performed on the basis of the information of the first elapsed time (elapsed time for calculation of the high-pass filter processing) which is output from the first elapsed time measurement unit 71A2. That is, in a case where the calculation of the high-pass filter processing in the high-pass filter processing unit 71A1 is reset, measurement of the first elapsed time is also reset. Accordingly, it is possible to determine whether or not the calculation of the high-pass filter processing is reset, on the basis of the first elapsed time. The output signal determination unit 71A5 forcibly switches the signal to be output to the non-high-pass signal in a case of determining that the calculation of the high-pass filter processing is reset.

Figure 9:
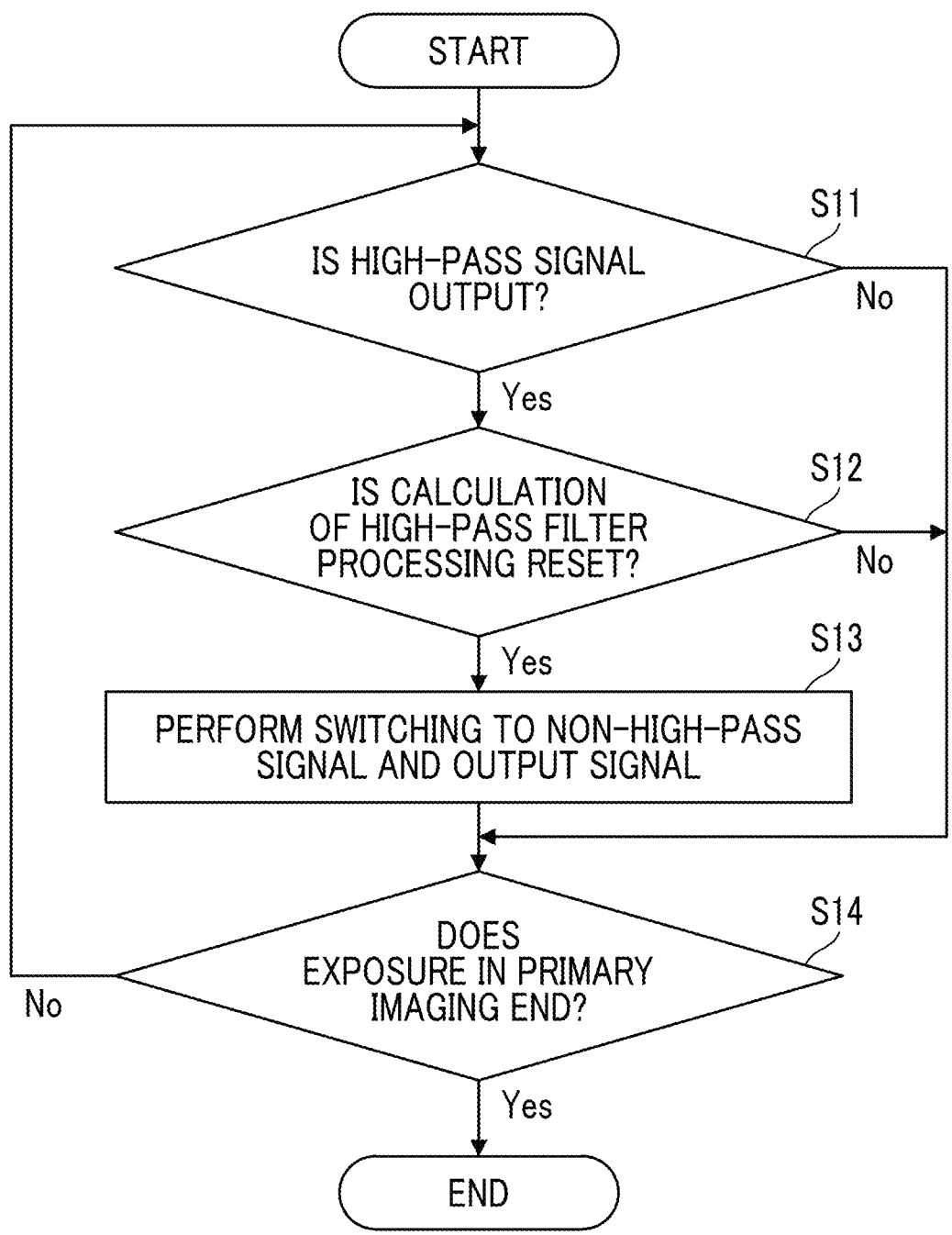
FIG. 9 is a flowchart showing a processing procedure in a case where a high-pass signal is forcibly switched to a non-high-pass signal in progress of exposure in the primary imaging.

FIG. 9 is a flowchart showing a processing procedure in a case where the high-pass signal is forcibly switched to the non-high-pass signal in progress of the exposure in the primary imaging.

The output signal determination unit 71A5 determines whether or not the signal to be output from the filter processing unit 71A is a high-pass signal (step S11). In a case where the signal to be output is not a high-pass signal (in a case of a non-high-pass signal), the processing proceeds to step S14.

In a case where the signal to be output is a high-pass signal, the output signal determination unit 71A5 determines whether or not the calculation of the high-pass filter processing is reset (step S12). In a case where it is determined that the calculation of the high-pass filter processing is not reset, the processing proceeds to step S14.

In a case where it is determined that the calculation of the high-pass filter processing is reset, the output signal determination unit 71A5 switches the signal to be output from the high-pass signal to the non-high-pass signal (step S13).

Thereafter, the output signal determination unit 71A5 determines whether or not the exposure ends (step S14). In a case where it is determined that the exposure ends, the processing ends. On the other hand, in a case where it is determined that the exposure does not end, the processing returns to step S11.

In such a manner, in a case where the high-pass signal is output, in a case where the calculation of the high-pass filter processing is reset in progress of the exposure, the signal to be output is forcibly switched to the non-high-pass signal. Thereby, it is possible to eliminate the influence of the reset and calculate the amount of blurring with higher accuracy.

The output signal determination unit 71A5 sets the HPF usage flag to "1" in a case of outputting a high-pass signal. On the other hand, in a case of outputting a non-high-pass signal, the HPF usage flag is set to "0".

The output signal switching unit 71A6 outputs either a high-pass signal or a non-high-pass signal in accordance with the determination made by the output signal determination unit 71A5. More specifically, one of a high-pass signal and a non-high-pass signal is output in accordance with the setting of the HPF usage flag. In a case where the HPF usage flag is "1", the high-pass signal is output. On the other hand, in a case where the HPF usage flag is "0", the non-high-pass signal is output.

[Operation of Filter Processing Unit (Signal Processing Method)]

Figure 10:
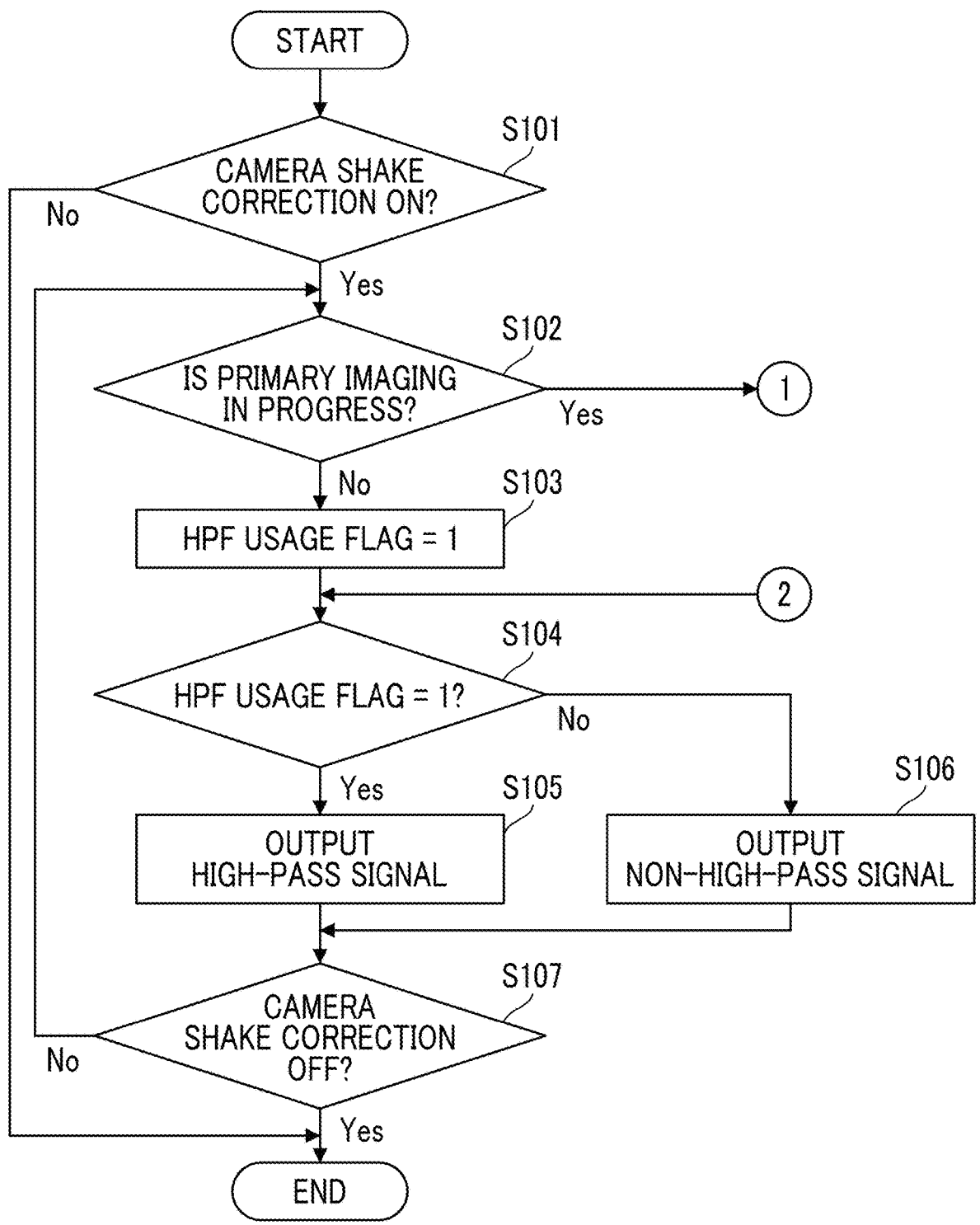
FIG. 10 is a flowchart showing a processing procedure of a filter processing unit in progress of exposure in the primary imaging.

FIG. 10 is a flowchart showing a processing procedure of the filter processing unit in progress of the exposure in the primary imaging.

In calculating the amount of blurring, the filter processing units 71A and 71B selectively output either a high-pass signal or a non-high-pass signal.

The calculation of the amount of blurring is performed in a case where the camera shake correction function is turned on. Consequently, first, it is determined whether or not the camera shake correction function is turned on (step S101).

In a case where the camera shake correction function is turned on, it is then determined whether or not the exposure in the primary imaging is in progress (step S102).

In a case where the exposure in the primary imaging is not performed, the amount of blurring is calculated using the high-pass signal. Consequently, in such a case, the HPF usage flag is set to "1" (step S103).

On the other hand, in a case where the exposure in the primary imaging is in progress, the HPF usage flag is set on the basis of the exposure time, the first elapsed time (elapsed time for calculation of the high-pass filter processing), and the second elapsed time (elapsed time from the start of output of the non-high-pass signal).

Figure 11:
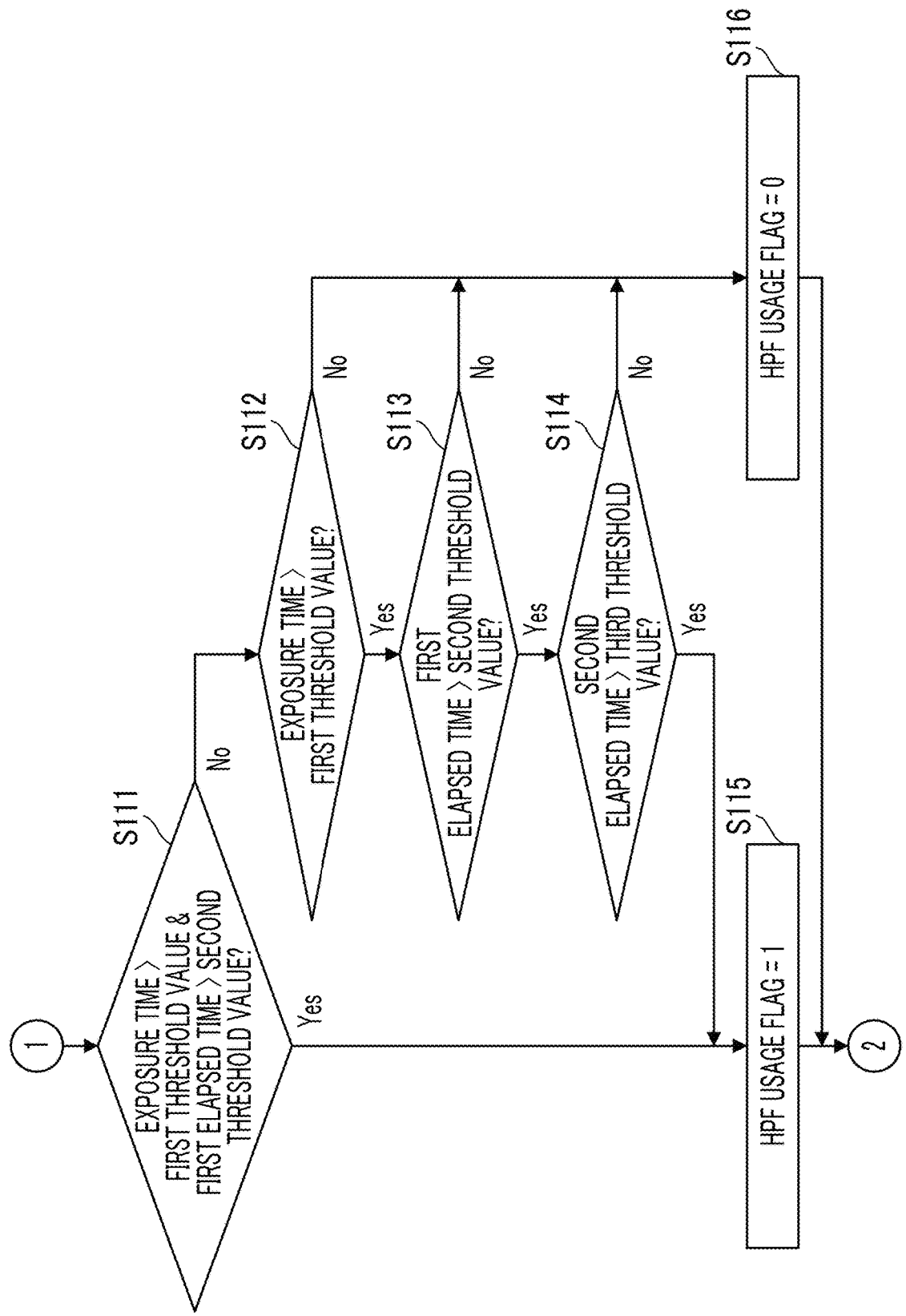
FIG. 11 is a flowchart showing a processing procedure of setting an HPF usage flag in progress of exposure in the primary imaging.

FIG. 11 is a flowchart showing a processing procedure of setting the HPF usage flag in progress of the exposure in the primary imaging.

First, it is determined whether or not the exposure time is greater than the first threshold value and the first elapsed time is greater than the second threshold value (step S111).

In a case where the exposure time is greater than the first threshold value and the first elapsed time is greater than the second threshold value, the amount of blurring is calculated using the high-pass signal. Consequently, in such a case, the HPF usage flag is set to "1" (step S115).

In a case where the exposure time is equal to or less than the first threshold value or the first elapsed time is equal to or less than the second threshold value, it is first determined whether or not the exposure time is greater than the first threshold value (step S112).

Here, in a case where the exposure time does not exceed the first threshold value, that is, in a case where the exposure time is equal to or less than the first threshold value, the amount of blurring is calculated using the non-high-pass signal. Consequently, in such a case, the HPF usage flag is set to "0" (step S116).

On the other hand, in a case where the exposure time is greater than the first threshold value, it is next determined whether or not the first elapsed time is greater than the second threshold value (step S113). That is, it is determined whether or not the elapsed time for calculation in the high-pass filter processing is greater than the second threshold value. Here, in a case where the first elapsed time does not exceed the second threshold value, the amount of blurring is calculated using the non-high-pass signal. Consequently, in such a case, the HPF usage flag is set to "0" (step S116). That is, the determination performed herein is to determine whether or not the calculation of the high-pass filter processing is reset in progress of the output of the high-pass signal. In a case where the calculation of the high-pass filter processing is reset in progress of the output of the high-pass signal, the first elapsed time is also reset. Consequently, in such a case, the signal to be output is forcibly switched from the high-pass signal to the non-high-pass signal.

In a case where the first elapsed time is greater than the second threshold value, it is then determined whether or not the second elapsed time is greater than the third threshold value (step S114). That is, it is determined whether or not the elapsed time from the start of output of the non-high-pass signal is greater than the third threshold value. Here, in a case where the second elapsed time is greater than the third threshold value, the HPF usage flag is set to "1" (step S115). On the other hand, in a case where the second elapsed time does not exceed the third threshold value, that is, in a case where the second elapsed time is equal to or less than the third threshold value, the HPF usage flag is set to "0" (step S116). That is, the determination performed herein is to determine whether or not the switching timing is reached in a case where the non-high-pass signal is switched to the high-pass signal in the middle of the processing. In a case where the switching timing is reached, the signal to be output is switched to a high-pass signal. That is, the HPF usage flag is set to "1" (step S115).

As described above, in progress of the exposure in the primary imaging, the HPF usage flag is set on the basis of the exposure time, the first elapsed time (elapsed time for calculation of the high-pass filter processing), and the second elapsed time (elapsed time from the start of output of the non-high-pass signal).

In a case where the setting of the HPF usage flag ends, it is determined whether or not the setting of the HPF usage flag is "1" as shown in FIG. 10 (step S104).

In a case where the HPF usage flag is set to "1", a high-pass signal is output from the filter processing units 71A and 71B (step S105). On the other hand, in a case where the HPF usage flag is set to "0", the non-high-pass signal is output from the filter processing units 71A and 71B (step S106).

Thereafter, it is determined whether or not the camera shake correction function is turned off (step S107). In a case where the camera shake correction function is turned off, the processing ends. On the other hand, in a case where the camera shake correction function is not turned off, the processing returns to step S102 and the processing is continued. In addition, in a case where power of the digital camera 1 is turned off, the camera shake correction function is also turned off.

As described above, in the digital camera 1 of the present embodiment, the high-pass signal and the non-high-pass signal are selectively output from the filter processing units 71A and 71B, and the amount of blurring is calculated. A high-pass signal is output and the amount of blurring is calculated in the rest of a period where the exposure in the primary imaging is in progress. In progress of the exposure in the primary imaging, the signal to be output can be determined on the basis of the exposure time, the first elapsed time (elapsed time for calculation of the high-pass filter processing), and the second elapsed time (elapsed time from the start of output of the non-high-pass signal). In a case where the exposure time is equal to or less than the first threshold value, the non-high-pass signal is output. In a case where the exposure time is greater than the first threshold value and the first elapsed time is greater than the second threshold value, the high-pass signal is output. In a case where the exposure time is greater than the first threshold value and the first elapsed time is equal to or less than the second threshold value, the non-high-pass signal is first output, and the high-pass signal is switched to and output in the middle of the processing. Even in a state where the high-pass signal is output, in a case where the calculation of the high-pass filter processing is reset in progress of the exposure, the signal forcibly output is switched to the non-high-pass signal. In such a manner, by appropriately controlling the output signal, it is possible to calculate the amount of blurring with higher accuracy. That is, it is possible to suppress occurrence of the low-frequency blurring residue while suppressing the effect of the offset.

As an example of the embodiment, description will be given of the processing of the filter processing unit in a case where the offset correction standard of the gyro sensor to be used and the offset correction calculation amount are within 14 [mdps] and the cut-off frequency in the high-pass filter processing is 0.01 [Hz]. It should be noted that the processing performed herein is the processing in progress of the exposure in the primary imaging.

The optimum first threshold value, second threshold value, and third threshold value are obtained by an experiment or a simulation. As a result of the experiment or the simulation, it is assumed that the first threshold value is set to 1 [s], the second threshold value is set to 15 [s], and the third threshold value is set to 1 [s].

In such a case, the output of the signal from the filter processing unit in progress of the exposure is controlled as follows.

(1) In a case where the exposure time is within 1 [s], a non-high-pass signal is output.
(2) In a case where the exposure time is greater than 1 "s" and the elapsed time for calculation (first elapsed time) of the high-pass filter processing is 15 [s] or less, the non-high-pass signal is output in the first 1 [s], and a high-pass signal is output for the remaining time.
(3) In a case where the exposure time is greater than 1 "s" and the elapsed time (first elapsed time) for calculation of the high-pass filter processing is greater than 15 [s], the high-pass signal is output.
(4) In a case where the high-pass signal is output in progress of the exposure and the calculation of the high-pass filter processing is reset, the high-pass signal is switched to the non-high-pass signal and output.

By controlling the signal to be output from the filter processing unit in such a manner, it is possible to suppress occurrence of the low-frequency blurring residue while suppressing the effect of the offset.

Figure 12:
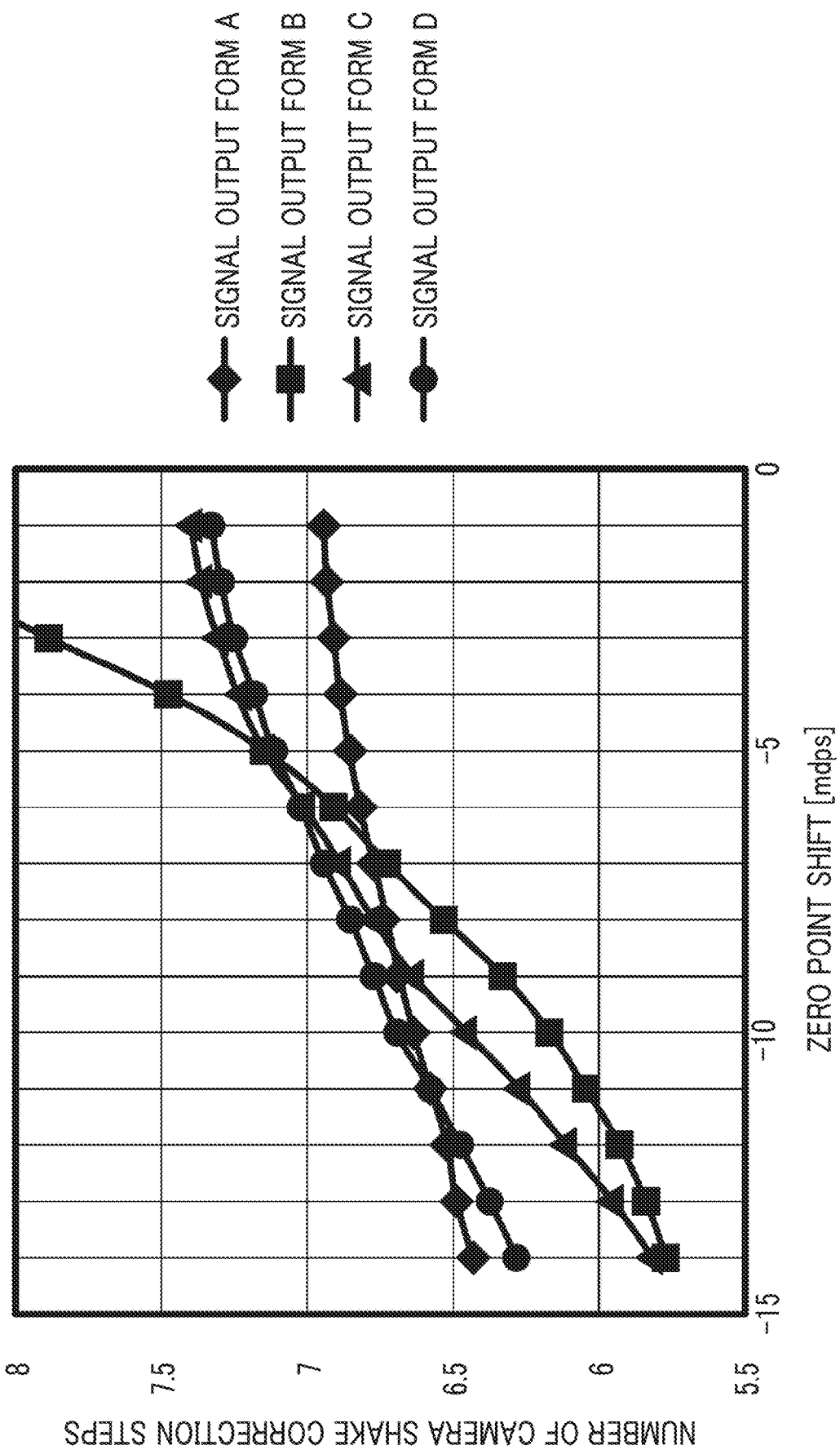
FIG. 12 is a graph in which correction effects of camera shake correction for each output form of a signal from a filter processing unit are compared.

FIG. 12 is a graph in which correction effects of camera shake correction for each output form of a signal from the filter processing unit are compared.

In the drawing, the horizontal axis represents an amount of zero point shift of the gyro sensor, and the vertical axis represents the number of camera shake correction steps. The number of camera shake correction steps indicates the performance of camera shake correction, and is measured on the basis of a method determined by a CIPA standard (CIPA DC-011-2015 a measurement method and a notation method (optical type) for a camera shake correction effect of a digital camera) which is standardized by the camera & imaging products association (CIPA).

In the drawing, a signal output form A is a signal output form that constantly outputs a high-pass signal. A signal output form B is a signal output form that constantly outputs a non-high-pass signal. A signal output form C is a signal output form in which a non-high-pass signal is first output and then switched to a high-pass signal after a lapse of a certain period of time. A signal output form D is a signal output form in which a non-high-pass signal is output in a case where the exposure time is greater than the first threshold value and the first elapsed time is greater than the second threshold value and a non-high-pass signal is first output and is switched to a high-pass signal after a lapse of a certain period of time in other cases.

As shown in the drawing, the signal output form A exhibits favorable performance in a case where the offset is large. On the other hand, in the signal output form B, the smaller the offset, the better the performance. The signal output form C exhibits better performance than the signal output form A in a case where the offset is small. The signal output form D stably exhibits favorable performance in both a case where the offset is large and a case where the offset is small.

As the method of the above-mentioned embodiment, a method of processing a signal (angular velocity signal) from a gyro sensor to calculate an amount of blurring and correcting the camera shake is the current method, and a method of constantly performing high-pass filter processing on the signal from the gyro sensor to calculate the amount of blurring and correcting the camera shake is a conventional method.

An experiment was performed in which a predetermined vibration imitating camera shake was applied and an image was captured 1000 times and the amount of blurring generated in the yaw direction and the pitch direction of the captured image was obtained. The cut-off frequency in the high-pass filter processing was set to 0.01 [Hz].

Figure 13:
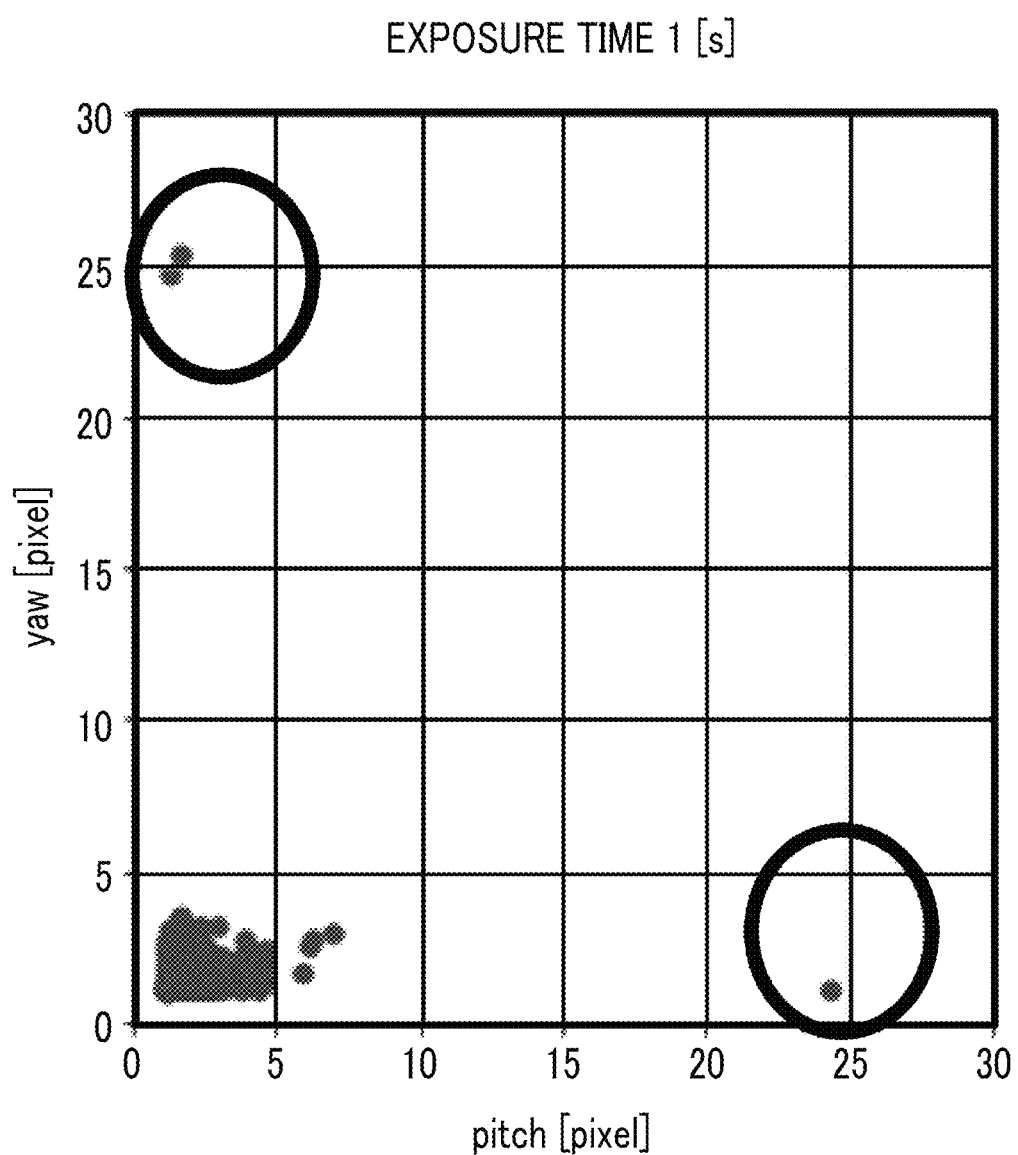
FIG. 13 is a graph showing distribution of an amount of blurring in the conventional method in a case where an exposure time is 1 [s].
Figure 14:
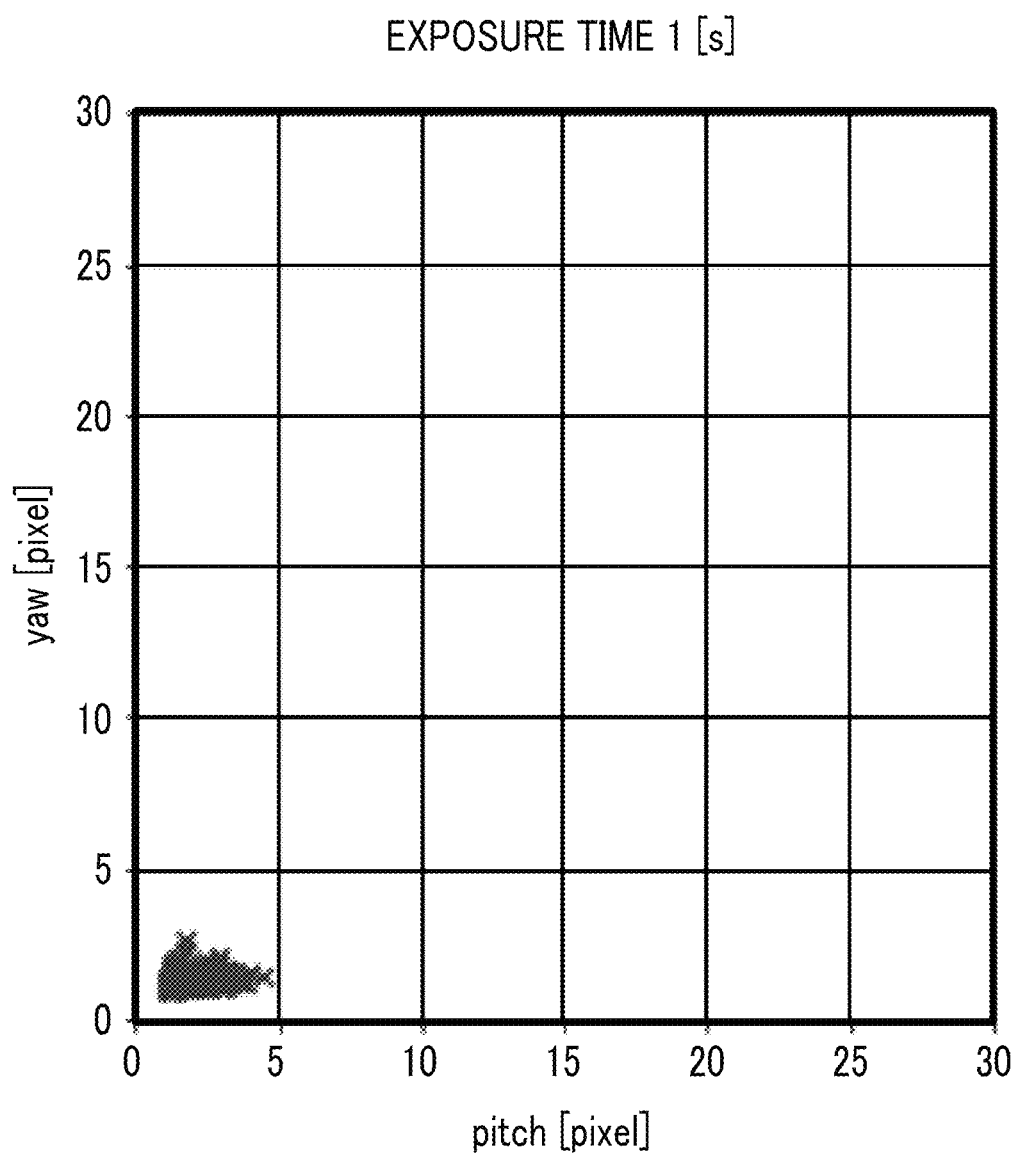
FIG. 14 is a graph showing distribution of the amount of blurring in the current method in a case where the exposure time is 1 [s].
Figure 15:
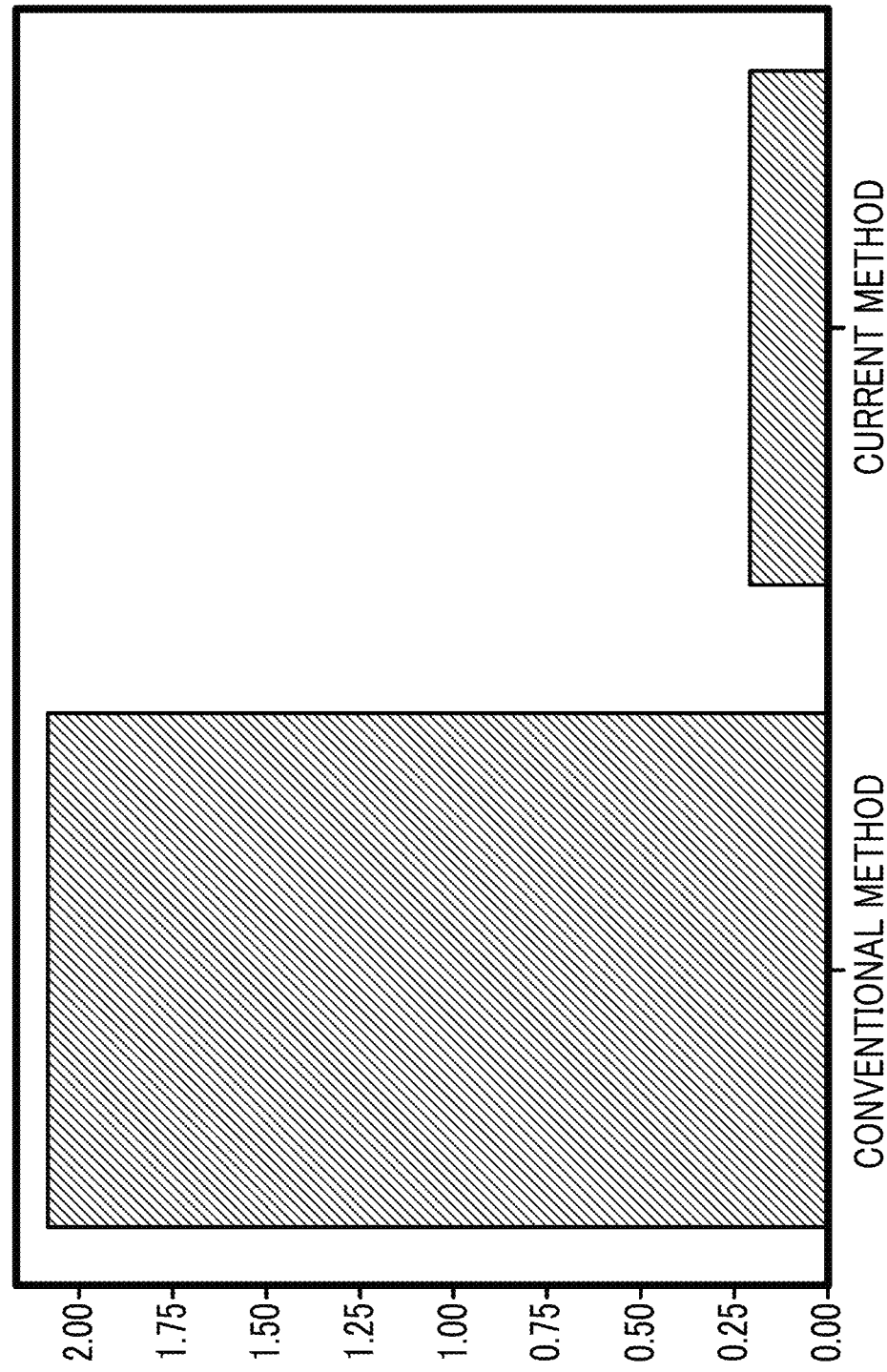
FIG. 15 is a graph in which dispersions of the amounts of blurring between the conventional method and the current method are compared in a case where the exposure time is 1 [s].
Figure 16:
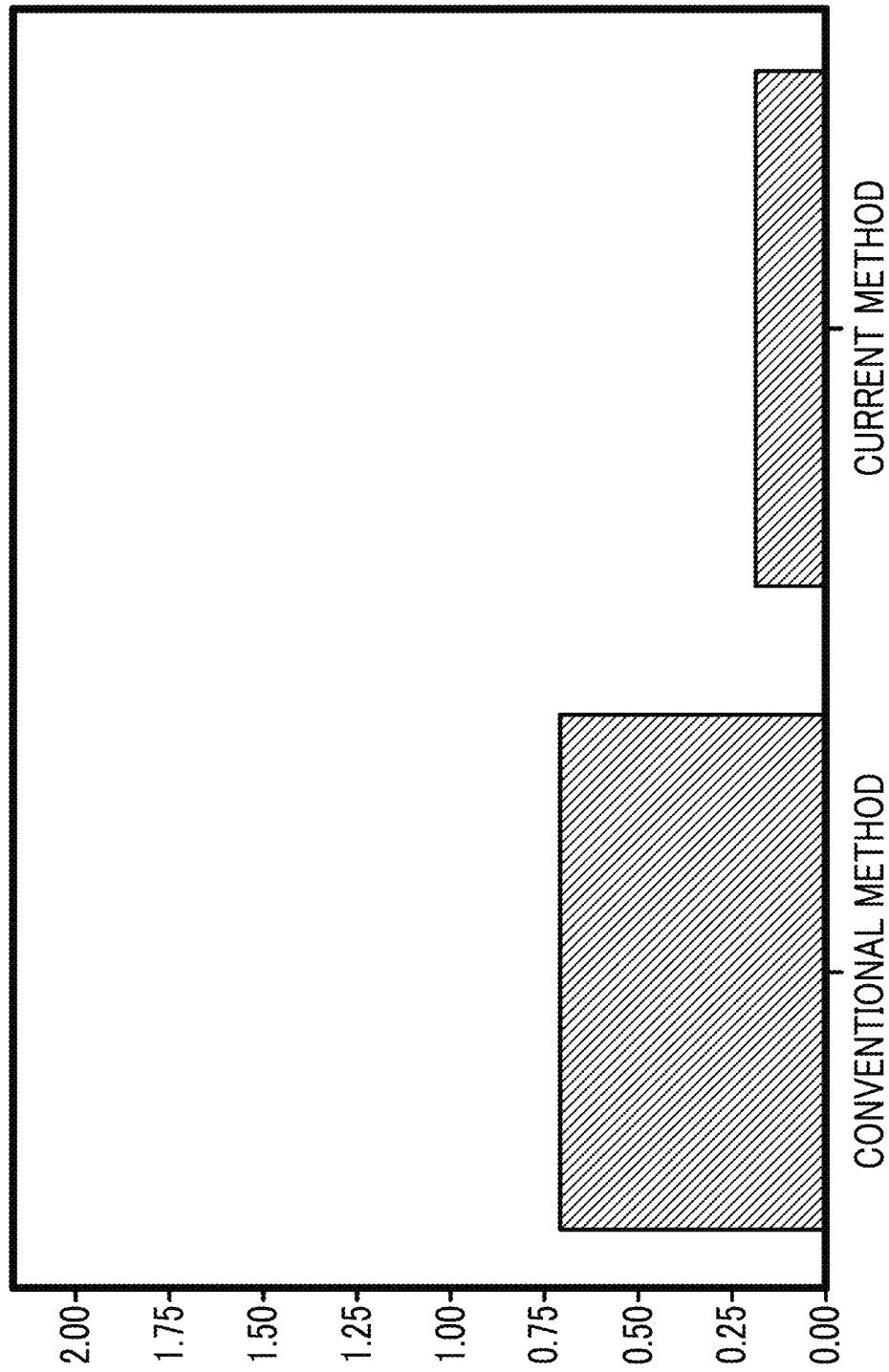
FIG. 16 is a graph in which dispersions obtained by excluding outliers from the amount of blurring between the conventional method and the current method are compared in a case where the exposure time is 1 [s].

FIG. 13 is a graph showing distribution of an amount of blurring in the conventional method in a case where the exposure time is 1 [s]. FIG. 14 is a graph showing distribution of an amount of blurring in the current method in a case where the exposure time is 1 [s]. Further, FIG. 15 is a graph in which dispersions of the amounts of blurring between the conventional method and the current method are compared in a case where the exposure time is 1 [s]. FIG. 16 is a graph in which dispersions obtained by excluding outliers from the amount of blurring between the conventional method and the current method are compared in a case where the exposure time is 1 [s].

As shown in FIG. 13, large blurring may occur in the conventional method (values in the circle in FIG. 13), whereas in the current method, occurrence of large blurring is not recognized as shown in FIG. 14.

Further, as shown in FIG. 15, it is recognized that the dispersion in the current method is smaller than that in the conventional method. Even in a case where the outlier is excluded, as shown in FIG. 16, it is recognized that the dispersion is smaller in the current method.

Figure 17:
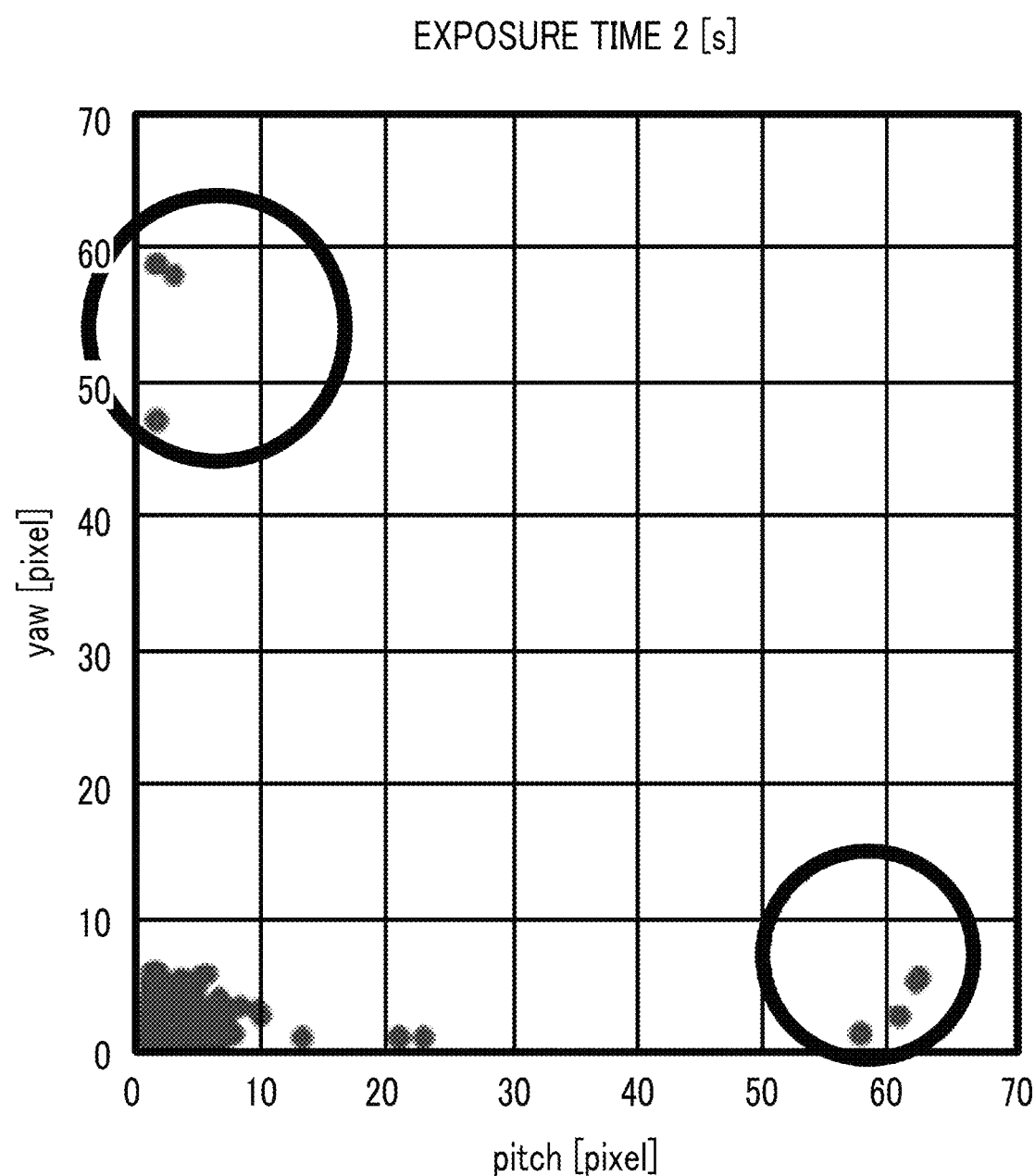
FIG. 17 is a graph showing distribution of the amount of blurring in a conventional method in a case where the exposure time is 2 [s].
Figure 18:
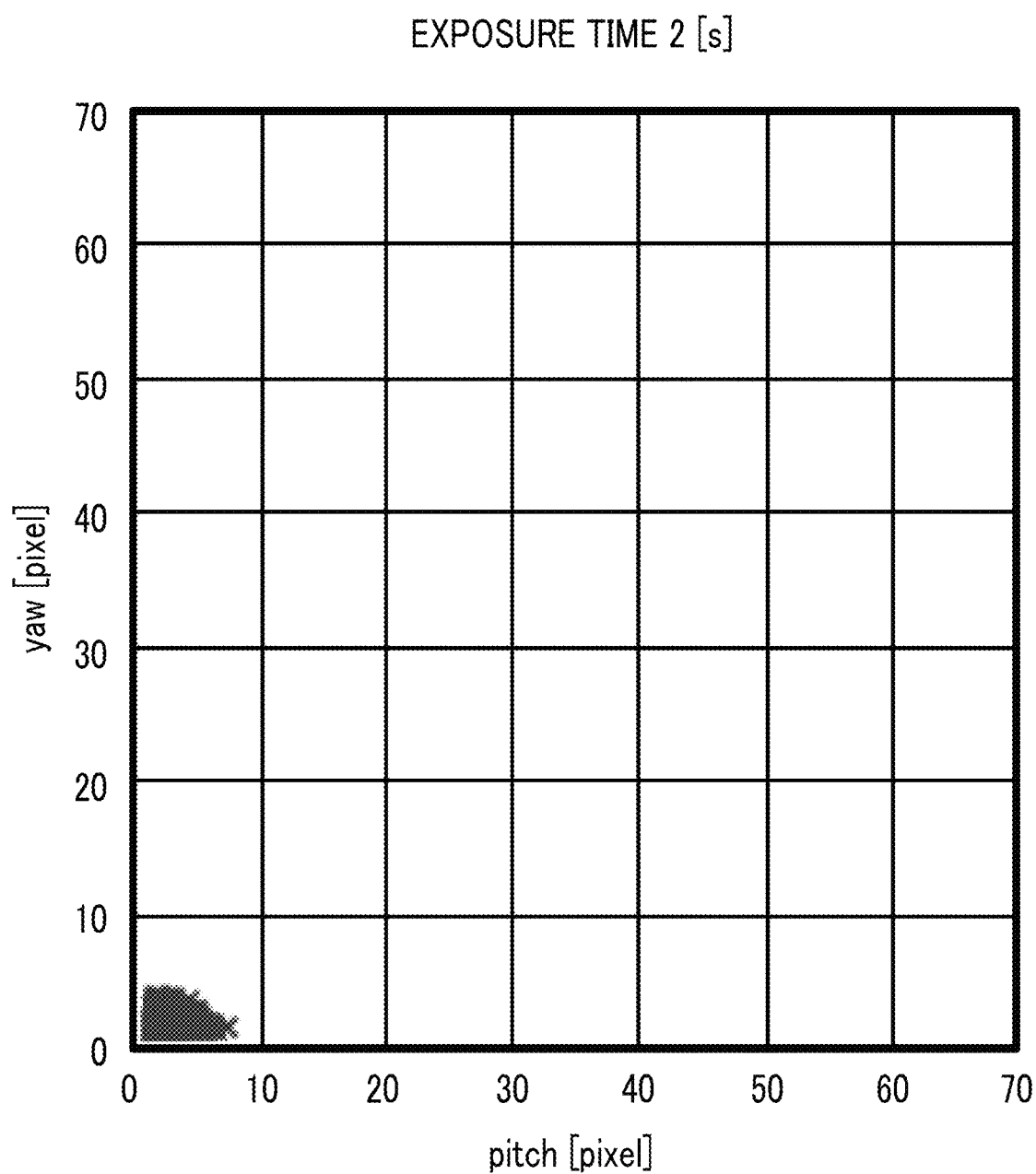
FIG. 18 is a graph showing distribution of the amount of blurring in the current method in a case where the exposure time is 2 [s].
Figure 19:
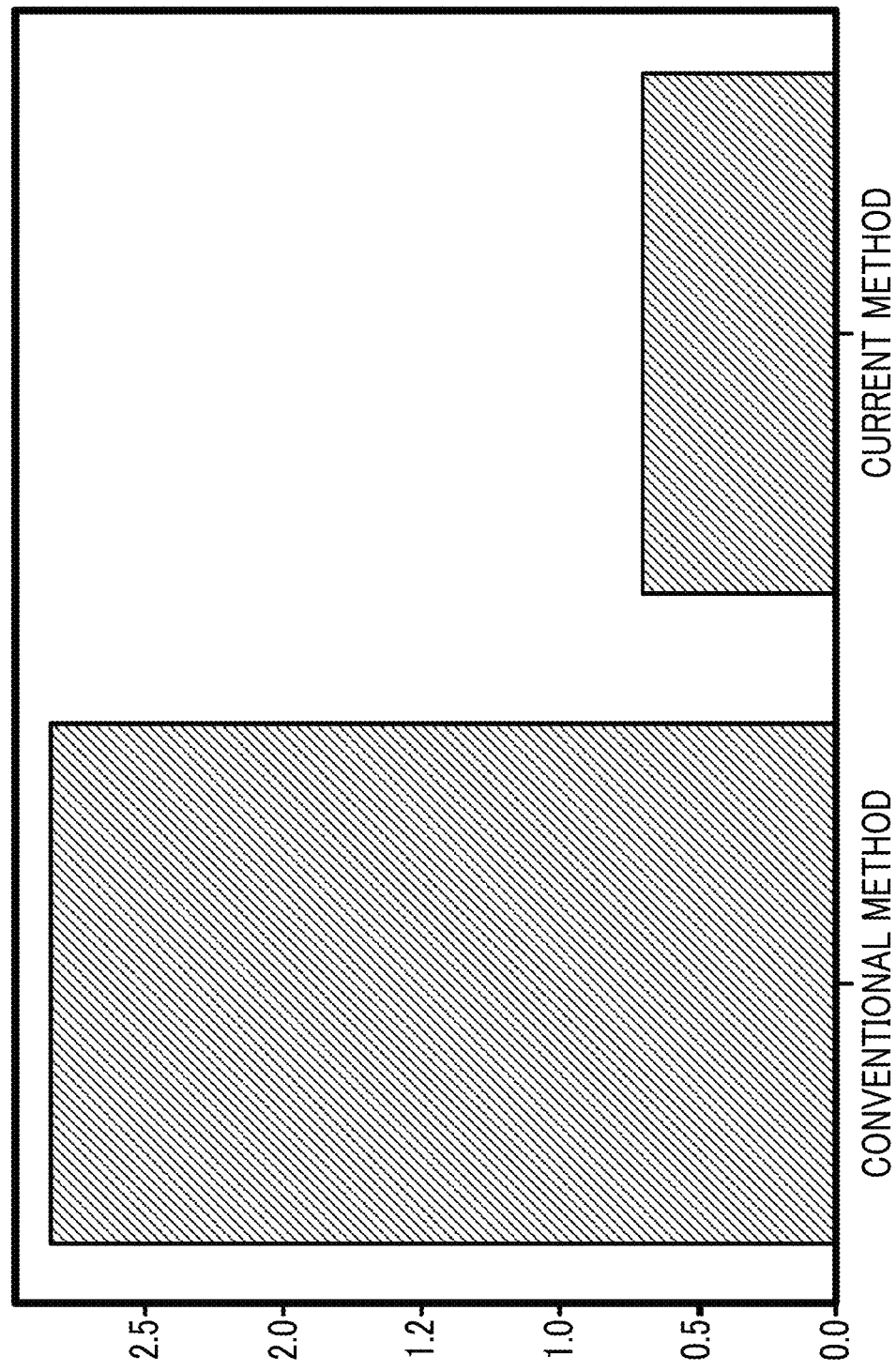
FIG. 19 is a graph in which dispersions of the amounts of blurring between the conventional method and the current method are compared in a case where the exposure time is 2 [s].
Figure 20:
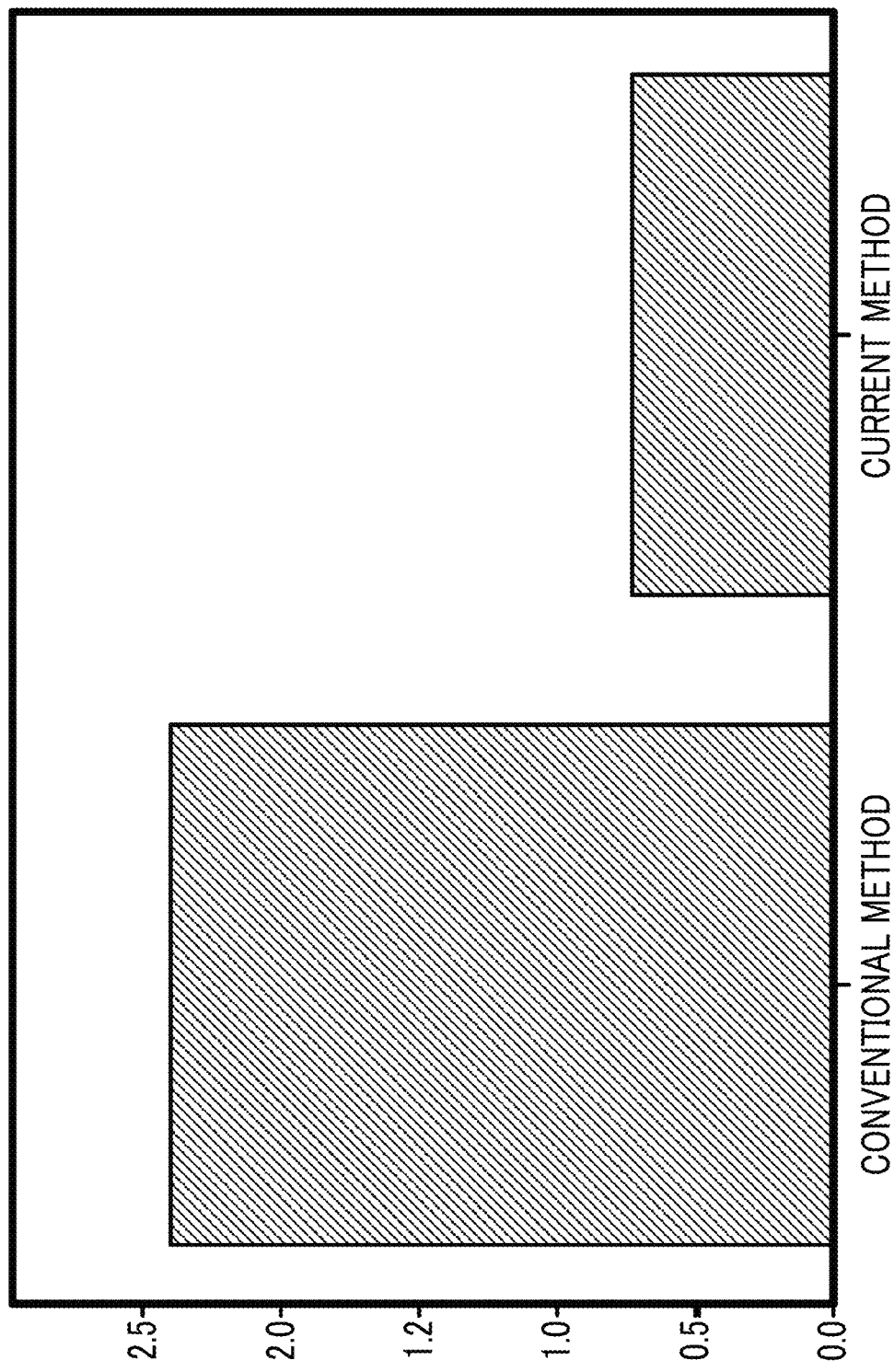
FIG. 20 is a graph in which dispersions obtained by excluding outliers from the amount of blurring between the conventional method and the current method are compared in a case where the exposure time is 2 [s].

FIG. 17 is a graph showing distribution of the amount of blurring in a conventional method in a case where the exposure time is 2 [s]. FIG. 18 is a graph showing distribution of the amount of blurring in the current method in a case where the exposure time is 2 [s]. Further, FIG. 19 is a graph in which dispersions of the amounts of blurring between the conventional method and the current method are compared in a case where the exposure time is 2 [s]. FIG. 20 is a graph in which dispersions obtained by excluding outliers from the amount of blurring between the conventional method and the current method are compared in a case where the exposure time is 2 [s].

Even in a case where the exposure time is 2 [s], large blurring may occur in the conventional method (values in the circle in FIG. 17), whereas in the current method, occurrence of large blurring is not recognized as shown in FIG. 18. Further, as shown in FIG. 19, even in a case where the exposure time is 2 [s], it is recognized that the dispersion of the current method is smaller than that of the conventional method. Even in a case where the outlier is excluded, as shown in FIG. 20, it is recognized that the dispersion is smaller in the current method.

Figure 21:
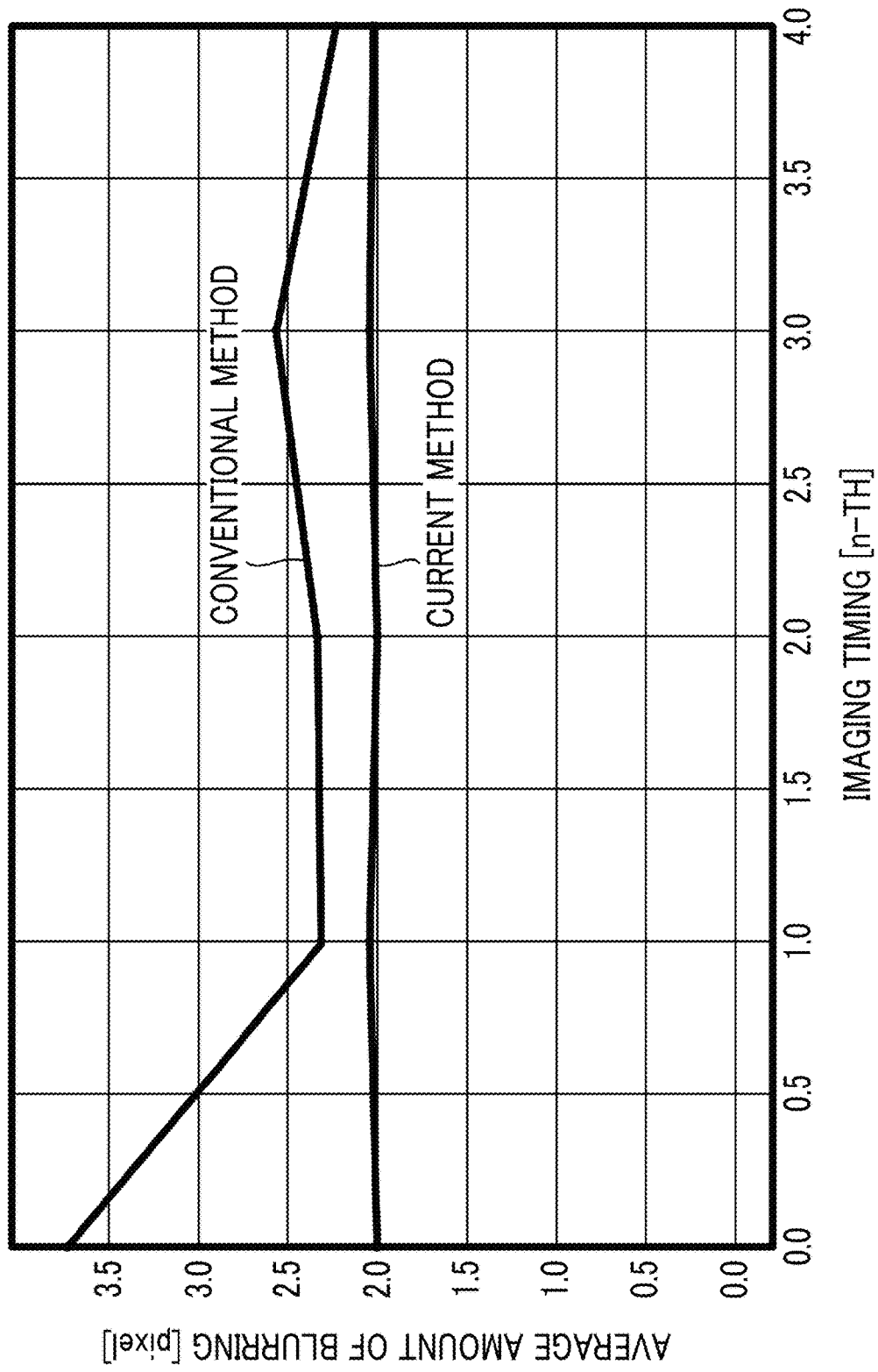
FIG. 21 is a graph in which average amounts of blurring for each imaging timing are compared in a case where the exposure time is 1 [s].
Figure 22:
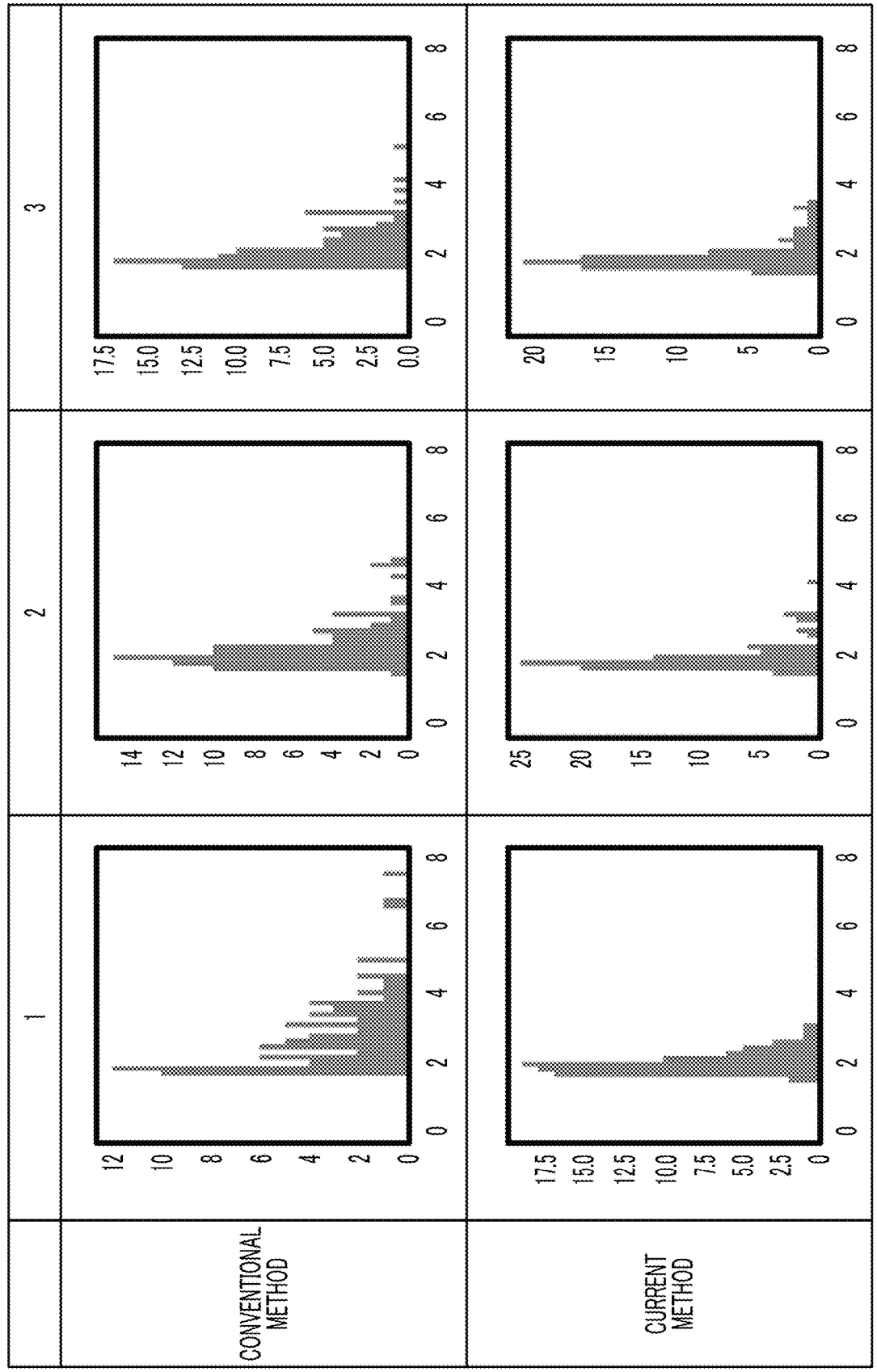
FIG. 22 is a histogram of an amount of blurring for each imaging timing in a case where the exposure time is 1 [s].

FIG. 21 is a graph in which average amounts of blurring for each imaging timing are compared in a case where the exposure time is 1 [s]. FIG. 22 is a histogram of an amount of blurring for each imaging timing in a case where the exposure time is 1 [s].

In the conventional method, the amount of blurring immediately after the start of imaging is large, whereas in the current method, it can be observed that there is no difference in amounts of blurring depending on the imaging timing.

Figure 23:
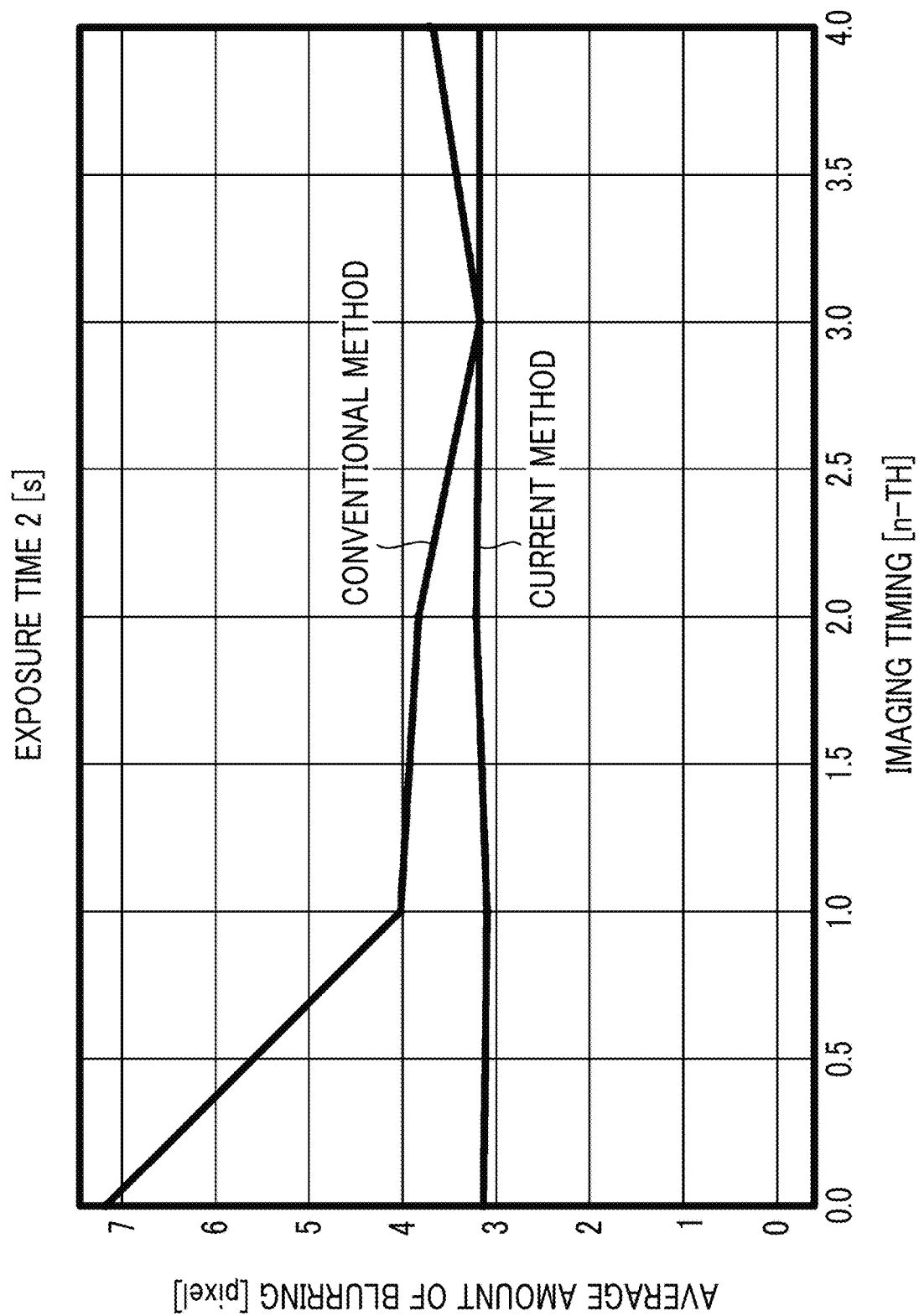
FIG. 23 is a graph in which average amounts of blurring for each imaging timing are compared in a case where the exposure time is 2 [s].
Figure 24:
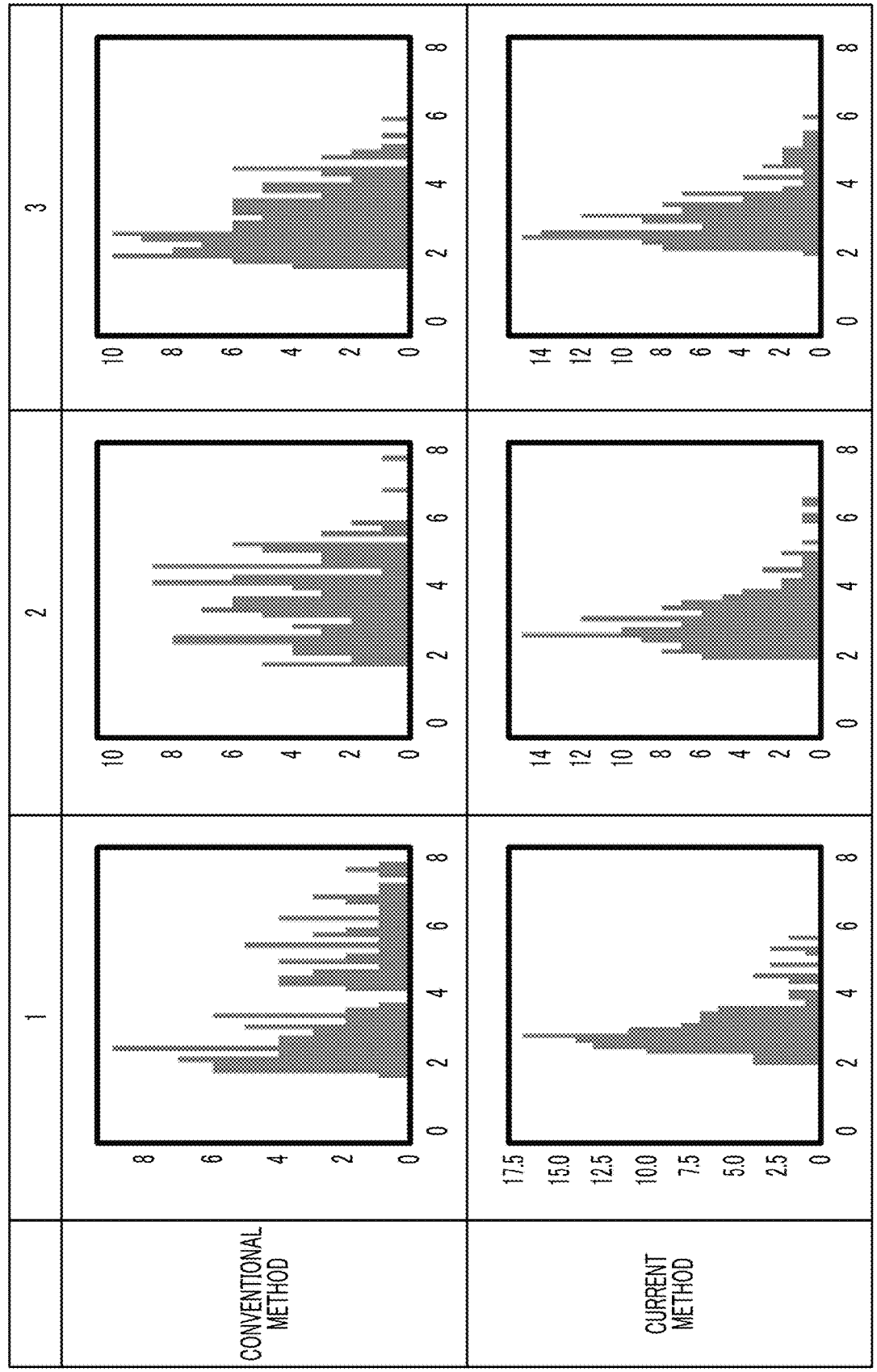
FIG. 24 is a histogram of an amount of blurring for each imaging timing in a case where the exposure time is 2 [s].

FIG. 23 is a graph in which average amounts of blurring for each imaging timing are compared in a case where the exposure time is 2 [s]. FIG. 24 is a histogram of an amount of blurring for each imaging timing in a case where the exposure time is 2 [s].

Even in a case where the exposure time is 2 [s], it can be observed that there is no difference in the amount of blurring depending on the imaging timing in the current method, whereas the amount of blurring immediately after the start of imaging is large in the conventional method.

Figure 25:
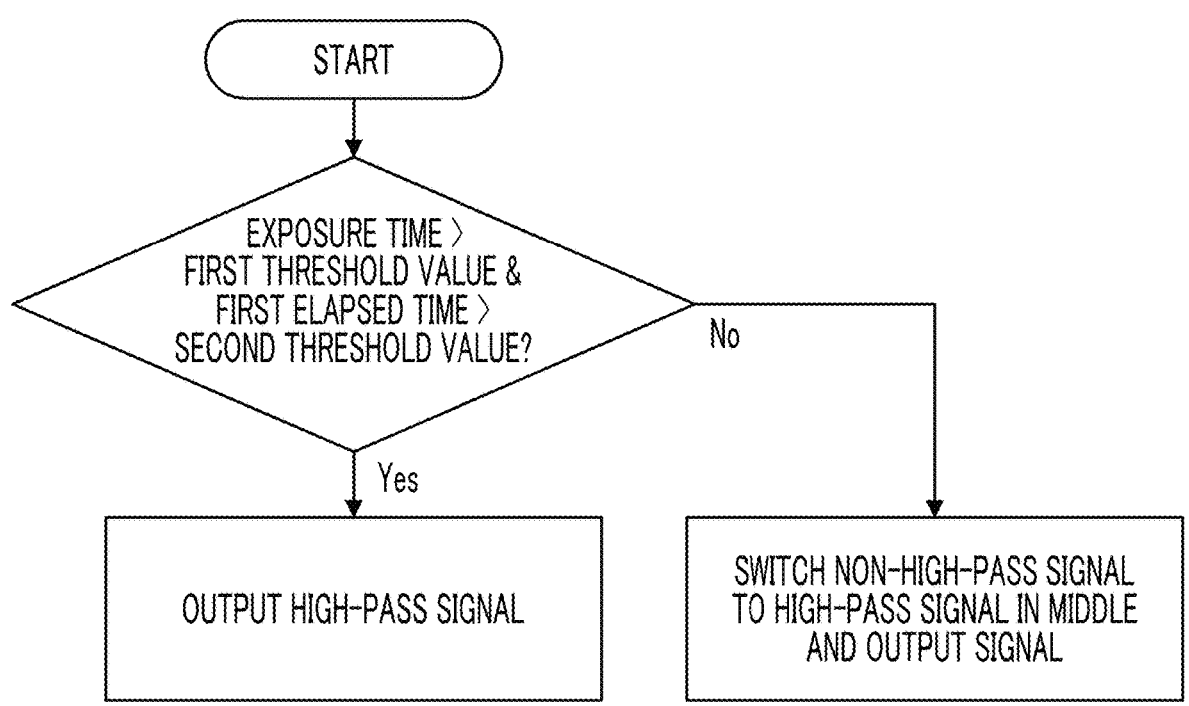
FIG. 25 is a conceptual diagram showing a modification example of a method of determining a signal to be output from the filter processing unit in progress of exposure in the primary imaging.

Modification Example of Method of Determining Signal to be Output from Filter Processing Unit FIG. 25 is a conceptual diagram showing a modification example of a method of determining a signal to be output from the filter processing unit in progress of exposure in the primary imaging.

In a case where the exposure time is greater than the first threshold value and the first elapsed time is greater than the second threshold value, the high-pass signal is output. Other than that, first, a non-high-pass signal is output, and then switched to a high-pass signal in the middle of the output. That is, in the embodiment described above, in a case where the exposure time is equal to or less than the first threshold value, the non-high-pass signal is continuously output. However, in the present example, the high-pass signal can be switched to the high-pass signal in the middle of the processing.

Even in a state where the high-pass signal is output, in a case where the calculation of the high-pass filter processing is reset in progress of the exposure, the signal is switched to the non-high-pass signal. This point is the same as that in the case of the above-mentioned embodiment.

Figure 26:
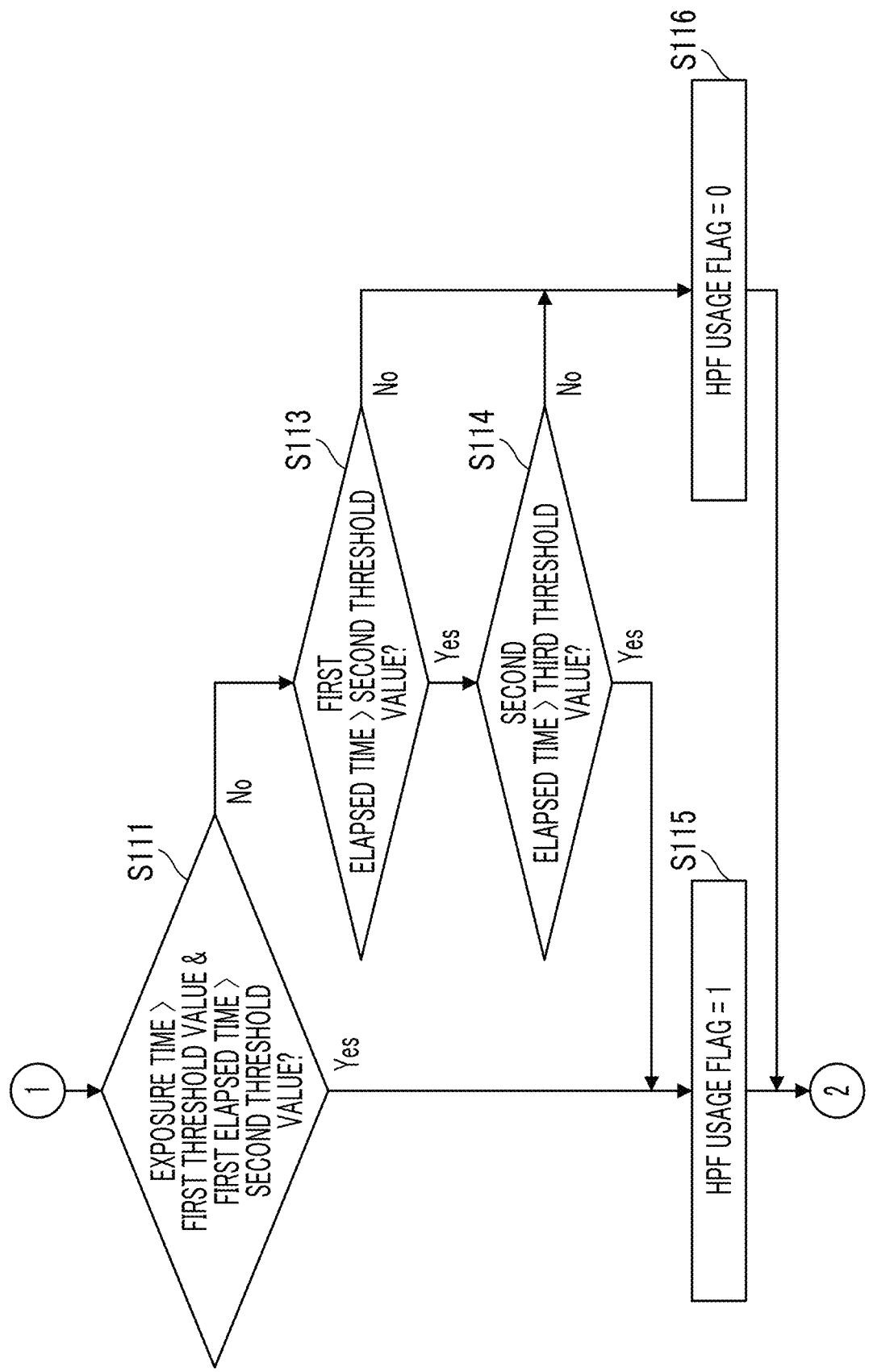
FIG. 26 is a flowchart showing a processing procedure of setting an HPF usage flag in progress of exposure in the primary imaging in a modification example.

FIG. 26 is a flowchart showing a processing procedure of setting an HPF usage flag in progress of exposure in the primary imaging in the modification example.

First, it is determined whether or not the exposure time is greater than the first threshold value and the first elapsed time is greater than the second threshold value (step S111). In a case where the exposure time is greater than the first threshold value and the first elapsed time is greater than the second threshold value, the amount of blurring is calculated using the high-pass signal. Consequently, in such a case, the HPF usage flag is set to "1" (step S115).

In a case where the exposure time is equal to or less than the first threshold value or the first elapsed time is equal to or less than the second threshold value, it is determined whether or not the first elapsed time is greater than the second threshold value (step S113). That is, it is determined whether or not the elapsed time for calculation in the high-pass filter processing is greater than the second threshold value. Here, in a case where the first elapsed time does not exceed the second threshold value, the amount of blurring is calculated using the non-high-pass signal. Consequently, in such a case, the HPF usage flag is set to "0" (step S116). The determination performed herein includes a determination as to whether or not the calculation of the high-pass filter processing is reset in progress of the output of the high-pass signal. In a case where the calculation of the high-pass filter processing is reset in progress of the output of the high-pass signal, the signal to be output is forcibly switched from the high-pass signal to the non-high-pass signal.

In a case where the first elapsed time is greater than the second threshold value, it is then determined whether or not the second elapsed time is greater than the third threshold value (step S114). Here, in a case where the second elapsed time is greater than the third threshold value, the HPF usage flag is set to "1" (step S115). On the other hand, in a case where the second elapsed time does not exceed the third threshold value, that is, in a case where the second elapsed time is equal to or less than the third threshold value, the HPF usage flag is set to "0" (step S116). That is, the determination performed herein is to determine whether or not the switching timing is reached in a case where the non-high-pass signal is switched to the high-pass signal in the middle of the processing. In a case where the switching timing is reached, the signal to be output is switched to a high-pass signal. That is, the HPF usage flag is set to "1" (step S115).

As described above, in the present modification example, in a case where the exposure time is greater than the first threshold value and the first elapsed time is greater than the second threshold value, the high-pass signal is output. Other than that, first, a non-high-pass signal is output, and then switched to a high-pass signal in the middle of the output. Thereby, it is possible to suppress the low-frequency blurring residue while suppressing the effect of the offset.

Embodiment of Optimization of Each Threshold Value

There is a method of determining the first threshold value, the second threshold value, and the third threshold value through simulation or the like. Further, for example, optimization can be performed in accordance with the following criteria.

A standard value of the offset (zero point shift) is set as n [mdps]. In a case where the standard value n of the offset is large, the cut-off frequency of the high-pass filter is large, and in a case where the standard value n of the offset is small, the cut-off frequency of the high-pass filter is small.

In a case where the cut-off frequency of the high-pass filter is m [Hz], a time, at which the direct current (DC) component which is an offset is removed by the high-pass filter processing and the remaining component is within 5 [mdps], is set as a second threshold value.

An exposure time in which the n * exposure time is within an amount of blurring of 3 pixels or less in each lens is set as the first threshold value. Here, the "amount of blurring of 3 pixels or less" means that the amount of blurring residue in the captured image is equivalent to that of 3 pixels or less. For example, in a case where one pixel is 3.7 [μm], the amount of blurring of 3 pixels or less is 3×3.7 [μm] in terms of the amount of image plane blurring. The term "in each lens" means that the focal length is different depending on the lens and should be obtained in accordance with the lens.

An exposure time in which the n * exposure time is within an amount of blurring of 2 pixels or less in each lens is set as the third threshold value.

The standard value of the offset is obtained by the following method. The gyro sensor is actually mounted on a digital camera, and an amount of change in offset is extracted as a standard. The worst value in the extracted standard is set as the standard value.

Embodiment of Optimization of Each Threshold Value Based on Offset

As described above, the optimum value of each threshold value used in determining the signal to be output from the filter processing unit changes depending on the offset. On the other hand, the offset is not a constant value but a value that fluctuates in accordance with the ambient temperature and the like. Consequently, it is preferable to detect the offset during the activation of the digital camera and optimize each threshold value on the basis of the detected offset.

For example, the offset is calculated from the output of the gyro sensor by the following method.

The offset is calculated on the basis of the extracted first feature amount and second feature amount by performing processing of extracting the first feature amount relating to the offset from the output signal of the gyro sensor, processing of integrating the output signal of the gyro sensor and processing of extracting the second feature amount relating to the offset from the integral value of the output signal of the gyro sensor.

Here, regarding the first feature amount, the extracted value can be used as the first feature amount by performing processing of extracting a direct current component amount from the output signal of the gyro sensor.

Regarding the second feature amount, the calculated value can be used as the second feature amount by performing processing of calculating the gradient of the accumulated integral value of the output signal of the gyro sensor.

Regarding the processing of calculating the offset on the basis of the first feature amount and the second feature amount, the calculation is performed by, for example, the following procedure. First, an absolute value of the difference between the first feature amount and the second feature amount is calculated. The calculated value is compared with the threshold value. It is assumed that the threshold value is a fourth threshold value. In a case where the calculated value is equal to or less than the fourth threshold value, the time during which the calculated value is kept equal to or less than the fourth threshold value is measured. In a case where the calculated value is kept equal to or less than the fourth threshold value for a specified time or longer, an arithmetic average of the first feature amount and the second feature amount (½ of the sum of the first feature amount and the second feature amount) is calculated as the offset. That is, in a case where the absolute value of the difference between the first feature amount and the second feature amount is kept equal to or less than the fourth threshold value for a certain period or longer, it is considered that the first feature amount and the second feature amount each indicate a correct offset, an arithmetic average thereof is calculated as the offset.

In addition, regarding the second feature amount, it is preferable to initialize the processing relating to the calculation of the offset in a case where the calculated change amount of the second feature amount is greater than a specific value, by further performing processing of calculating a change amount of the second feature amount. Thereby, erroneous detection can be prevented.

Further, it is more preferable that the processing relating to the calculation of the offset is performed while the digital camera is stationary. The processing of determining the stationary state is determined on the basis of the output signal of the gyro sensor.

The calculated offset is used for optimizing each of the first to third threshold values, and is also used for removing the offset. The offset correction unit includes the offset calculation function mentioned above, and performs the offset correction processing using the calculated offset. An example of the configuration in such a case will be described below.

Embodiment of Modification Example of Offset Correction Unit

Since the functions of the two offset correction units 60A and 60B are the same, only the function of the offset correction unit 60A will be described herein.

Figure 27:
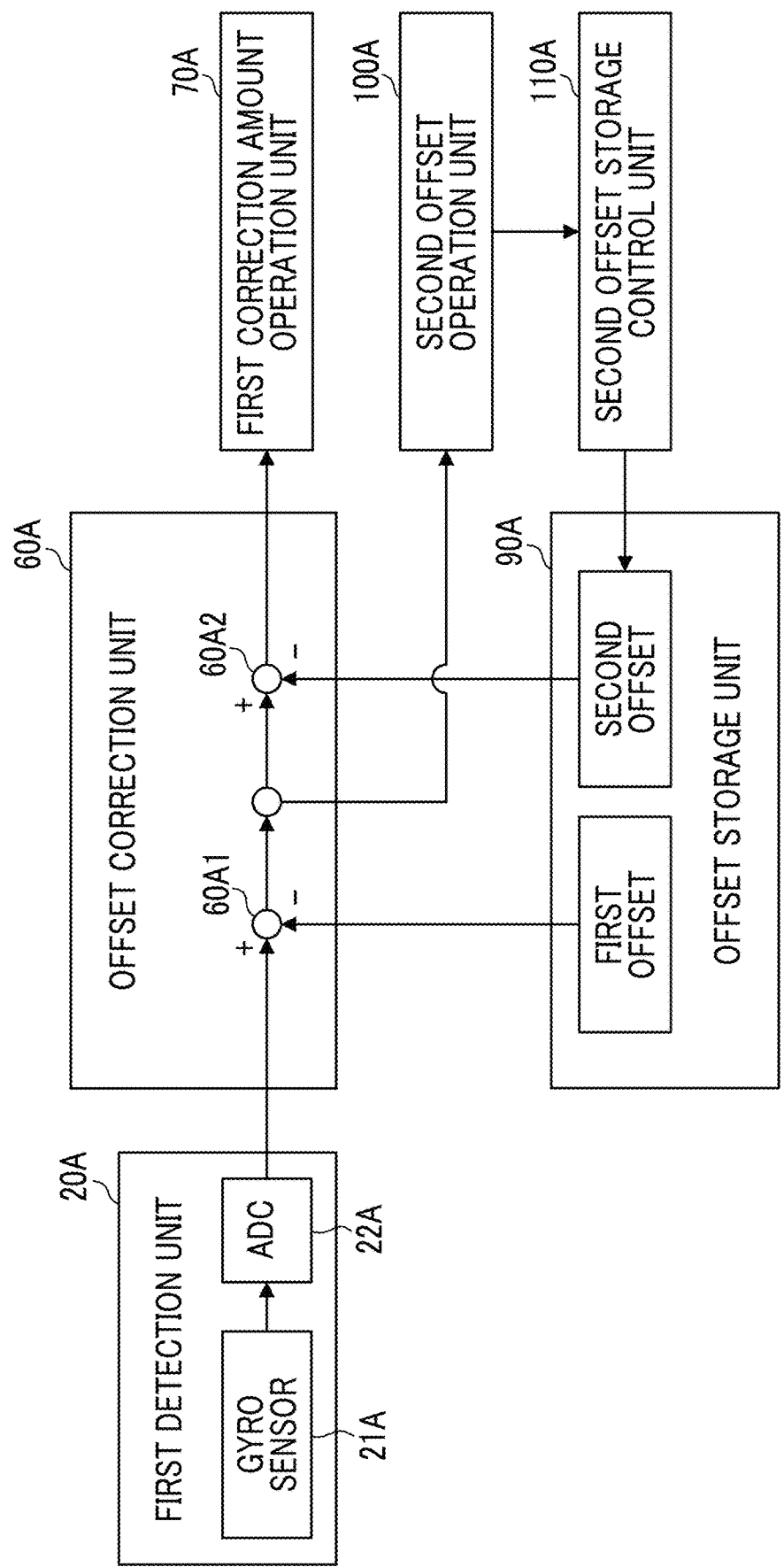
FIG. 27 is a block diagram of functions of an offset correction unit.

FIG. 27 is a block diagram of functions of the offset correction unit.

As shown in the drawing, the offset correction unit 60A has functions of a first subtraction unit 60A1 and a second subtraction unit 60A2.

The first subtraction unit 60A1 subtracts a first offset from an output signal of the first detection unit 20A. The first offset is a standard offset and is a fixed value. The first offset is set, for example, at the time of shipment from a factory. In such a case, for example, the offset is detected at the time of shipment from the factory, and the detected offset is set as the first offset.

The second subtraction unit 60A2 subtracts a second offset from the signal after the first offset is subtracted. The second offset is a latest offset. The second offset is an example of the offset of the present invention. The second offset operation unit 100A calculates the second offset. The second offset operation unit 100A calculates the second offset on the basis of the signal after the first offset is subtracted. The second offset operation unit 100A will be described later in detail.

The offset storage unit 90A is composed of the auxiliary storage unit 42. The offset storage unit 90A stores information about the first offset and the second offset which are used by the offset correction unit 60A. The second offset storage control unit 110A causes the offset storage unit 90A to store the second offset information calculated by the second offset operation unit 100A.

Figure 28:
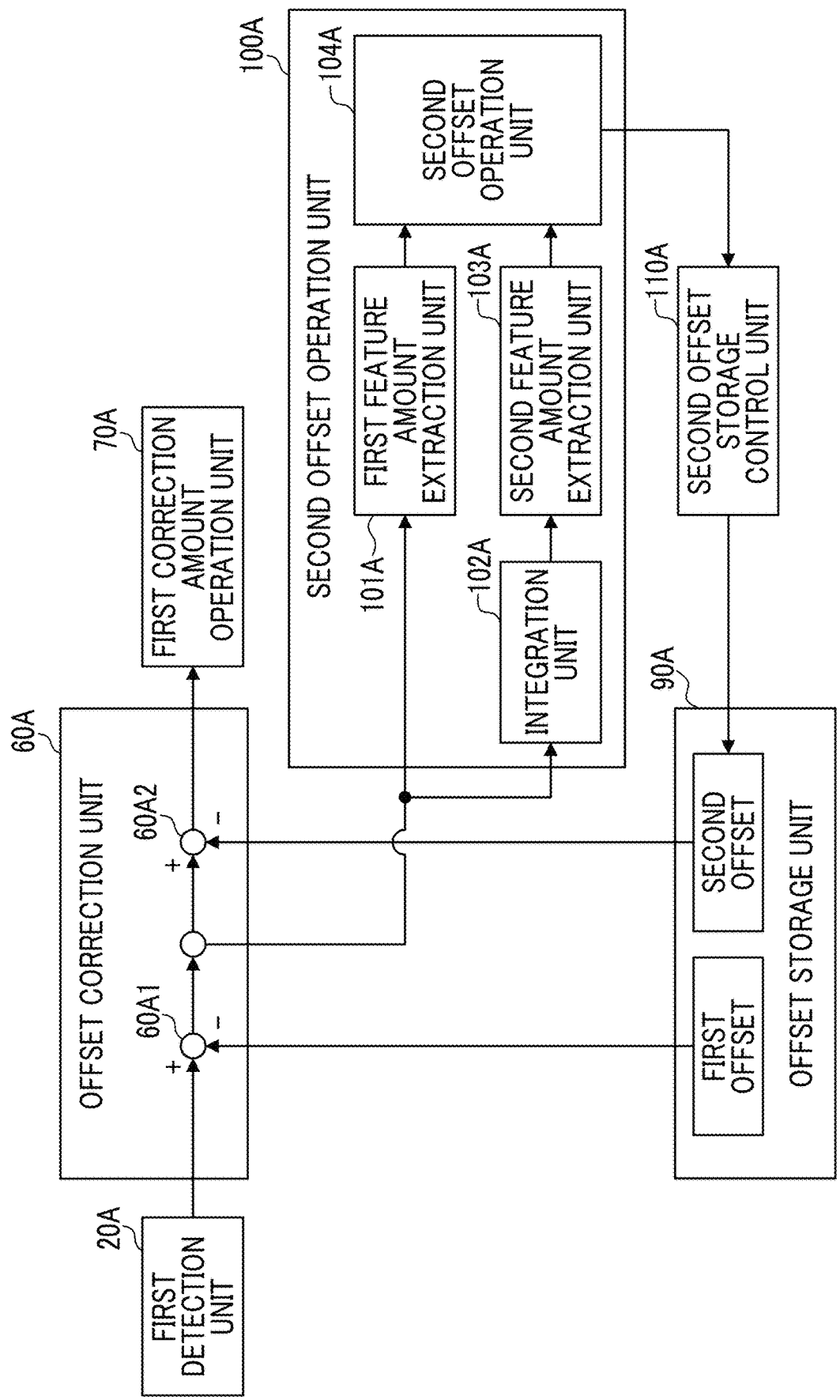
FIG. 28 is a block diagram of functions of a second offset operation unit.

FIG. 28 is a block diagram of functions of the second offset operation unit.

As shown in the drawing, the second offset operation unit 100A has functions of a first feature amount extraction unit 101A, an integration unit 102A, a second feature amount extraction unit 103A, and a second offset operation unit 104A.

The first feature amount extraction unit 101A performs processing of extracting the first feature amount relating to the second offset from the output signal of the first detection unit 20A after the first offset is removed. Specifically, processing of calculating an amount of direct current component from the output signal of the first detection unit 20A after removing the first offset is performed, and the calculated amount of direct current component is output as the first feature amount. The first feature amount extraction unit 101A calculates the amount of direct current component, which is the first feature amount, by performing low-pass filter (LPF) processing or band-pass filter (BPF) processing on the output signal of the first detection unit 20A after the first offset is removed. Hereinafter, this point will be described.

It is assumed that a random noise generated from the gyro sensor is f(t), an angular velocity signal generated from the gyro sensor is g(t), and an offset (constant) generated from the gyro sensor is O. The output ω_OUT from the gyro sensor is expressed by Expression (1).

$$\omega\_OUT = f(t) + O + g(t) \quad (1)$$

The offset O which is generated from the gyro sensor is the first feature amount to be obtained. Since the offset O is a direct current component, the components of f(t) and g(t) can be removed by applying a low-pass filter or a band-pass filter to Expression (1). Therefore, it is possible to extract the first feature amount by subjecting the output signal of the first detection unit 20A after the first offset removal to the low-pass filter processing or the band-pass filter processing.

The integration unit 102A performs processing of integrating the output signal of the first detection unit 20A after removing the first offset. The angular signal is obtained by the current processing.

The angular signal deg_out is calculated by Expression (2) by integrating Expression (1).

$$\deg\_out = \int (\omega\_OUT) dt \quad (2)$$
$$= \int (g(t)) dt + \int (f(t)) dt + Ot + C$$

C: integral constant

The second feature amount extraction unit 103A performs processing of extracting a second feature amount relating to the offset from an output of the integration unit 102A. That is, the second feature amount is extracted from a value (angular signal) obtained by integrating the output signals of the first detection unit 20A. Specifically, a gradient of the accumulated integral value is calculated from the output of the integration unit 102A and set as the second feature amount. The second feature amount extraction unit 103A obtains, for example, a linear approximation curve of the accumulated integral value, calculates a gradient thereof, and extracts the second feature amount. That is, from Expression (2), after enough time has passed, in a case where Ot>>∫(g(t))dt+∫(f(t))dt, it is possible to estimate the offset O from the gradient of the linear approximation curve of deg_out.

Figure 29:
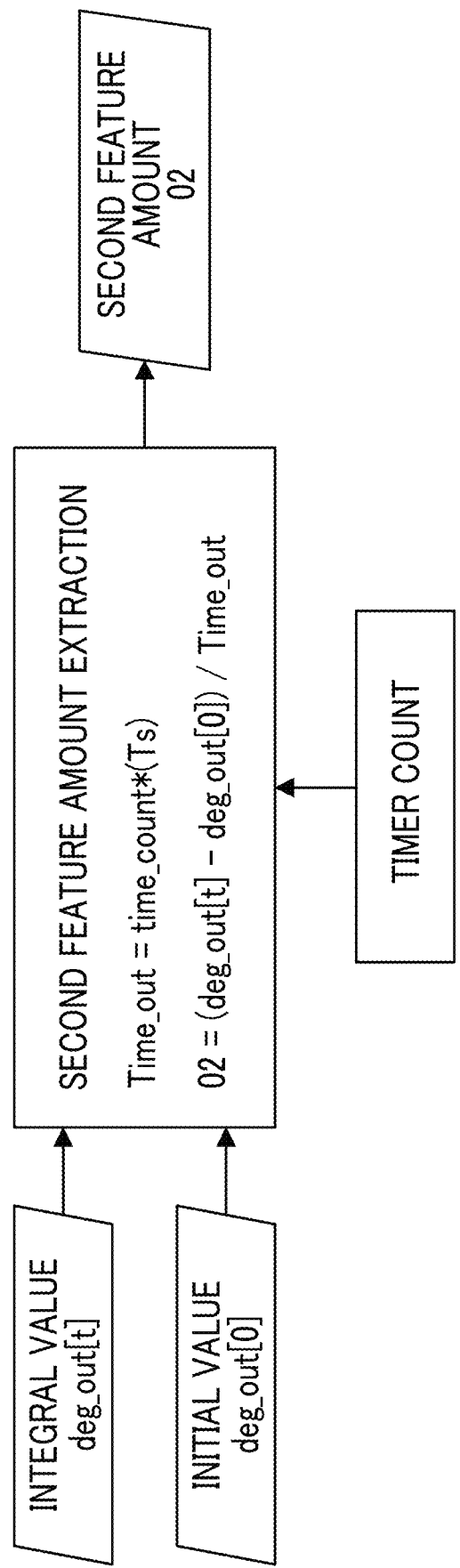
FIG. 29 is a conceptual diagram of a second feature amount extraction processing performed by a second feature amount extraction unit.

FIG. 29 is a conceptual diagram of the extraction processing of the second feature amount performed by the second feature amount extraction unit.

Assuming that ∫(g(t))dt=G[t], ∫(f(t))dt=F[t], and the integral value is deg_out[t], the integral value deg_out[t] is represented by deg_out[t]≈G[t]+F[t]+Ot.

The initial value is an integral value at which calculation of the second feature amount (gradient of the accumulated integral value) is started. The initial value is set to deg_out[0].

In the timer count, the count is incremented by 1 for each control cycle. Then, a value of the control cycle (Ts) [s] is multiplied.

Time_out=time_count*(Ts)

Assuming that the second feature amount (gradient of the accumulated integral value) is O2, O2 is calculated by the following expression.

O2=(deg_out[t]−deg_out[0])/Time_out

The second offset operation unit 104A calculates the second offset on the basis of the first feature amount and the second feature amount extracted by the first feature amount extraction unit 101A and the second feature amount extraction unit 103A. Specifically, it is determined whether or not the first feature amount and the second feature amount satisfy a certain condition. In a case where the condition is satisfied, an arithmetic average of both of the feature amounts is calculated as the second offset. That is, an arithmetic average of both thereof is calculated as the second offset. The condition, in which the first feature amount and the second feature amount has to be satisfied, is that an absolute value of the difference between the first feature amount and the second feature amount is equal to or less than a fourth threshold value and is kept equal to or less than the fourth threshold value for a specified time or longer.

Figure 30:
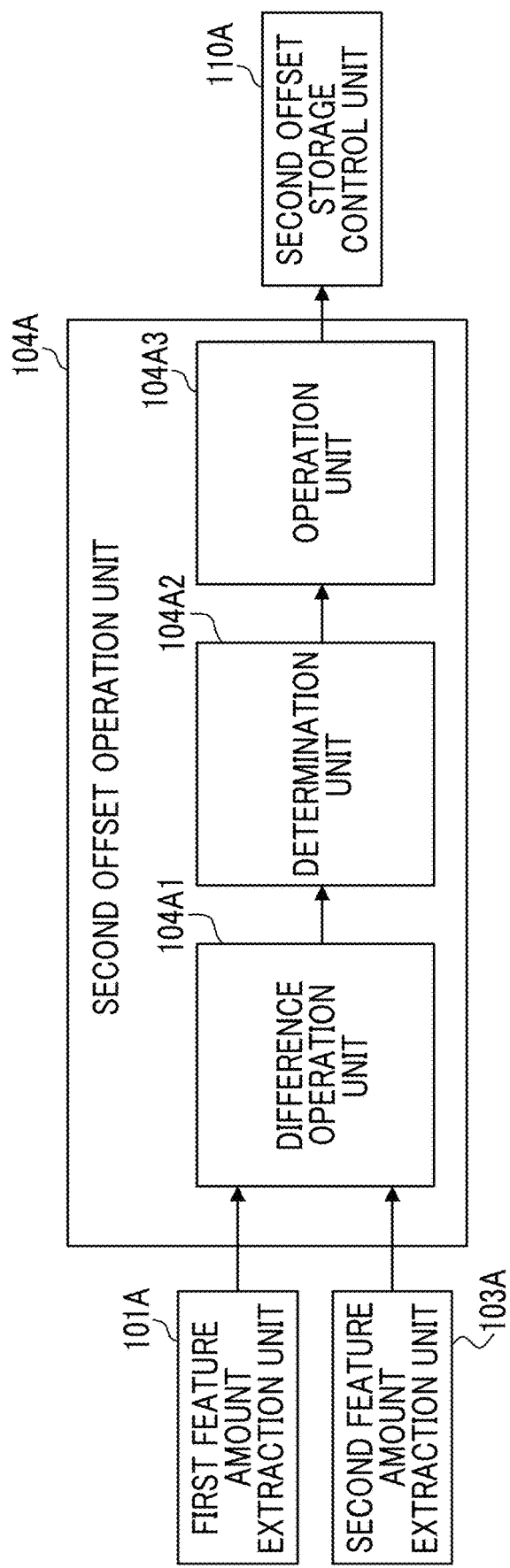
FIG. 30 is a block diagram of functions of the second offset operation unit.

FIG. 30 is a block diagram of functions of the second offset operation unit.

As shown in the drawing, the second offset operation unit 104A has functions of a difference operation unit 104A1, a determination unit 104A2, and a operation unit 104A3.

The difference operation unit 104A1 calculates the absolute value of the difference between the first feature amount and the second feature amount.

The determination unit 104A2 determines whether or not the absolute value of the difference between the first feature amount and the second feature amount calculated by the difference operation unit 104A1 is equal to or less than the fourth threshold value and is kept equal to or less than the threshold value for the specified time or longer. In such a case, first, the determination unit 104A2 determines whether or not the absolute value of the difference between the first feature amount and the second feature amount is equal to or less than the fourth threshold value. In a case where it is determined that the absolute value is equal to or less than the fourth threshold value, the determination unit 104A2 determines whether or not the absolute value is kept equal to or less than the fourth threshold value for the specified time or longer. Consequently, in a case where the absolute value of the difference between the first feature amount and the second feature amount is equal to or less than the fourth threshold value, the determination unit 104A2 counts (measures) a duration time thereof. The fourth threshold value and the specified time are predetermined and stored in the memory.

The operation unit 104A3 calculates the second offset on the basis of the first feature amount and the second feature amount in a case where the determination unit 104A2 determines that the above-mentioned condition is satisfied. Specifically, the determination unit 104A2 calculates an arithmetic average of the first feature amount and the second feature amount at a time in a case where it is determined that the above-mentioned condition is satisfied, and calculates the second offset.

Figure 31:
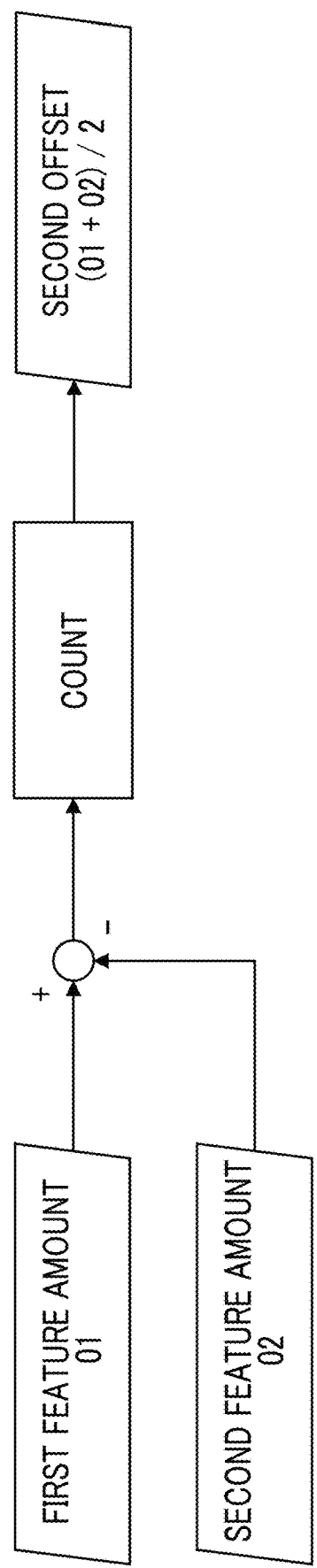
FIG. 31 is a conceptual diagram of second offset calculation processing performed by the second offset operation unit.

FIG. 31 is a conceptual diagram of calculation processing of the second offset performed by the second offset operation unit.

The first feature amount which is extracted by the first feature amount extraction unit 101A is O1, and the second feature amount which is extracted by the second feature amount extraction unit 103A is O2. Further, the specified time is represented as thresh_time, and the fourth threshold value is represented as threshold.

First, the absolute value (|O2−O1|) of the difference between the first feature amount O1 and the second feature amount O2 is calculated.

In the count, |O2−O1| and the threshold are compared, and in a case where |O2−O1|≤threshold, the count is incremented by 1. In a case where |O2−O1|>threshold, the count is set to 0.

In a case where count>thresh_time, the second offset is calculated on the basis of the first feature amount O1 and the second feature amount O2 at the time point. That is, the following calculation is executed to calculate the second offset.

The second offset=(O1+O2)/2

In a case where the second offset is calculated, the processing relating to the calculation of the second offset is initialized (reset). That is, the filter processing is reset in the first feature amount extraction unit 101A. Further, in the second feature amount extraction unit 103A, a start position of the calculation is initialized. Specifically, the value is returned to t=0, and the initial value deg_out[0] is updated.

Further, in a case where the second offset is calculated, information about the calculated second offset is stored in the offset storage unit 90A by the second offset storage control unit 110A. That is, the information about the second offset which is stored in the offset storage unit 90A is updated. Thereby, the information about the second offset which is stored in the offset storage unit 90A is maintained up to date. The initial value of the second offset which is stored in the offset storage unit 90A is 0.

As described above, in the present embodiment, in a case where the two feature amounts (first feature amount and second feature amount) relating to the offset are extracted from the output signal of the first detection unit 20A and the two extracted feature amounts satisfy a certain condition, the second offset is obtained from the two feature amounts. That is, in a case where the two feature amounts substantially coincide with each other, an arithmetic average thereof is calculated to obtain the second offset. The determination which is performed by the determination unit 104A2 is to determine whether or not the first feature amount and the second feature amount coincide with each other. That is, in a case where the absolute value of the difference between the first feature amount and the second feature amount is equal to or less than the fourth threshold value and is kept equal to or less than the threshold value for the specified time or longer, the second offset is calculated on the assumption that the first feature amount and the second feature amount coincide with each other.

In such a manner, the second offset can be accurately obtained by obtaining the two feature amounts and obtaining the second offset. That is, it is difficult to obtain an accurate second offset using only one feature amount, but it is possible to accurately obtain the second offset by using the two feature amounts.

For example, consider a case where the second offset is obtained only from the first feature amount. In such a case, since there are variations in the signals after the filter processing, it is difficult to accurately estimate the second offset.

In a similar manner, consider a case where the second offset is obtained only from the second feature amount. As shown in Expression (2), the angular signal includes $\int(g(t))dt$ and $\int(f(t))dt$ as a function of the time t. Therefore, in a case where the second offset (the gradient of the accumulated integral value) is obtained only from the angular signal, an accurate value may not be necessary due to the effect of the function$[\int(g(t))dt+\int(f(t))dt]$ of the time t.

However, in a case where both values substantially coincide with each other, it is considered that this case indicates an accurate offset value. Consequently, the second offset can be accurately obtained by obtaining the second offset from the two feature amounts.

The first feature amount is extracted by subjecting the output signal (angular velocity signal) of the first detection unit 20A to the filter processing. The reason is that, in a case where the integral value (angular signal) of the output signal of the first detection unit 20A is subjected to filter processing, the value of the offset O, which is a feature amount originally desired to be obtained, may change.

Figure 32:
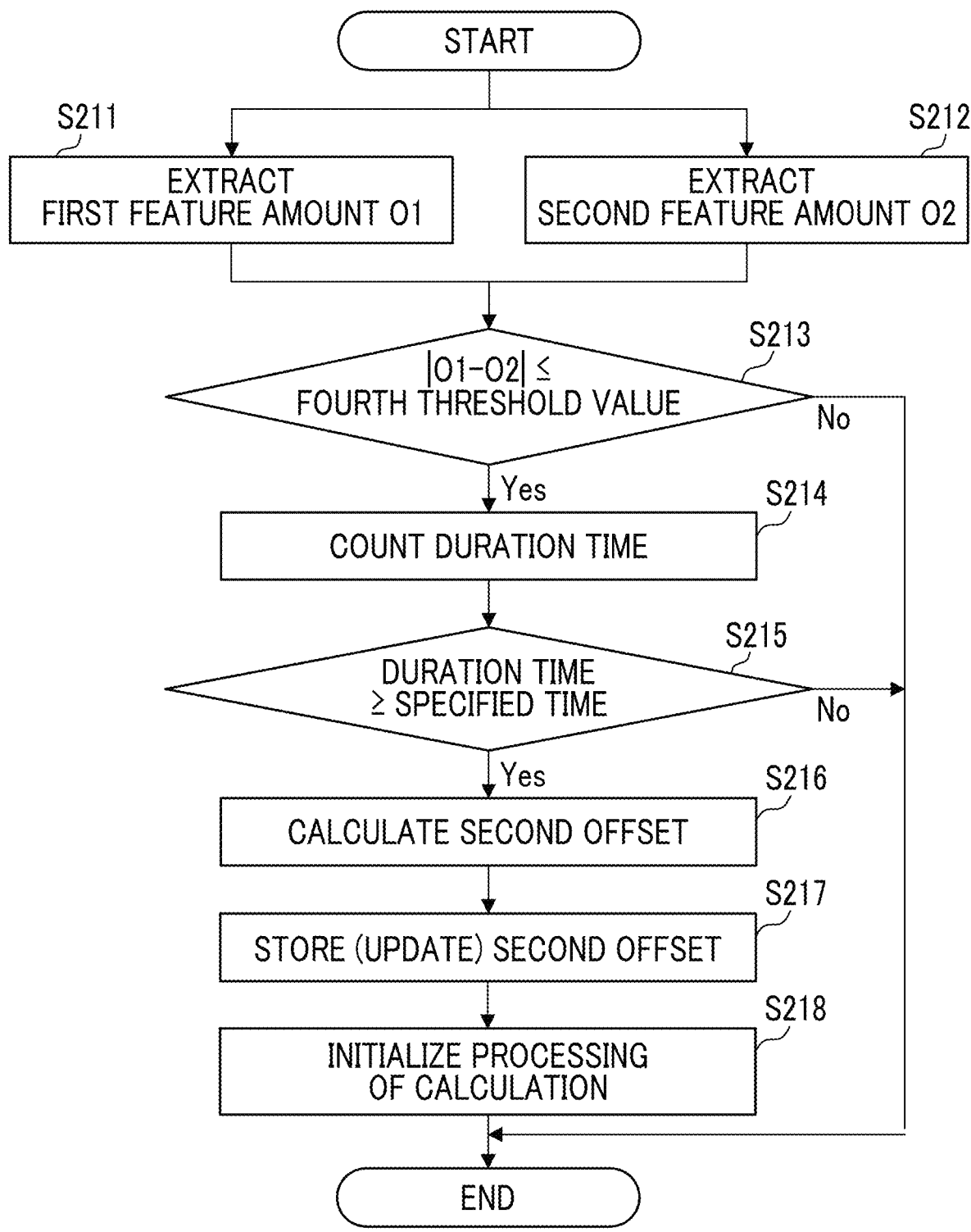
FIG. 32 is a flowchart showing a processing procedure of the second offset calculation.

FIG. 32 is a flowchart showing a processing procedure of the calculation of the second offset.

First, the first feature amount O1 and the second feature amount O2 are extracted from the output signal of the first detection unit 20A (steps S211 and S212). The output signal described herein is an output signal after the first offset is removed.

The first feature amount O1 is extracted by subjecting the output signals of the first detection unit 20A and the second detection unit 20B to the predetermined filter processing. That is, the output signals of the first detection unit 20A and the second detection unit 20B are subjected to the low-pass filter processing or the band-pass filter processing so as to calculate the amount of direct current component to be extracted.

The second feature amount O2 is extracted by integrating the output signals of the first detection unit 20A and the second detection unit 20B and obtaining the gradient of the accumulated integral value thereof.

Next, the absolute value (|O1-O2|) of the difference between the extracted first feature amount O1 and the second feature amount O2 is calculated and compared with the fourth threshold value. That is, it is determined whether or not the absolute value (|O1-O2|) of the difference between the first feature amount O1 and the second feature amount O2 is equal to or less than the fourth threshold value (step S213).

In a case where the absolute value (|O1-O2|) of the difference between the first feature amount O1 and the second feature amount O2 is determined to be equal to or less than the fourth threshold value, the duration time thereof is counted (step S214). Then, it is determined whether or not the counted duration time is equal to or longer than the specified time (step S215).

In a case where it is determined that the absolute value is kept equal to or less than the fourth threshold value for the specified time or longer, the second offset is calculated by assuming that the first feature amount O1 and the second feature amount O2 coincide with each other (step S216). That is, an arithmetic average of the first feature amount O1 and the second feature amount O2 at the time at which it is determined that the specified time or longer has passed is calculated and set as the value of the second offset.

In a case where the second offset is calculated, the value of the calculated second offset is stored in the offset storage units 90A and 90B (step S217). More specifically, the information about the second offset which is stored in the offset storage units 90A and 90B is rewritten. Through this processing, the information about the second offset which is stored in the offset storage units 90A and 90B is updated.

In a case where the calculated second offset value is stored in the offset storage units 90A and 90B, the processing relating to the calculation of the second offset is initialized (step S218). That is, the filter processing is reset for the calculation of the first feature amount, and the start position of the calculation is initialized for the calculation of the second feature amount.

The series of processing is repeatedly executed at regular intervals while the digital camera is operating. In a case where the second offset is not calculated during one calculation cycle (in a case where the difference between the first feature amount and the second feature amount does not satisfy the condition), the processing relating to the calculation is initialized, and the calculation is performed in the next cycle. In such a case, the detected value is maintained for the second offset.

As described above, in the present embodiment, the two feature amounts (first feature amount and second feature amount) relating to the offset are extracted, and the two feature amounts are compared to obtain the second offset. Therefore, the second offset can be obtained with high accuracy.

Figure 33:
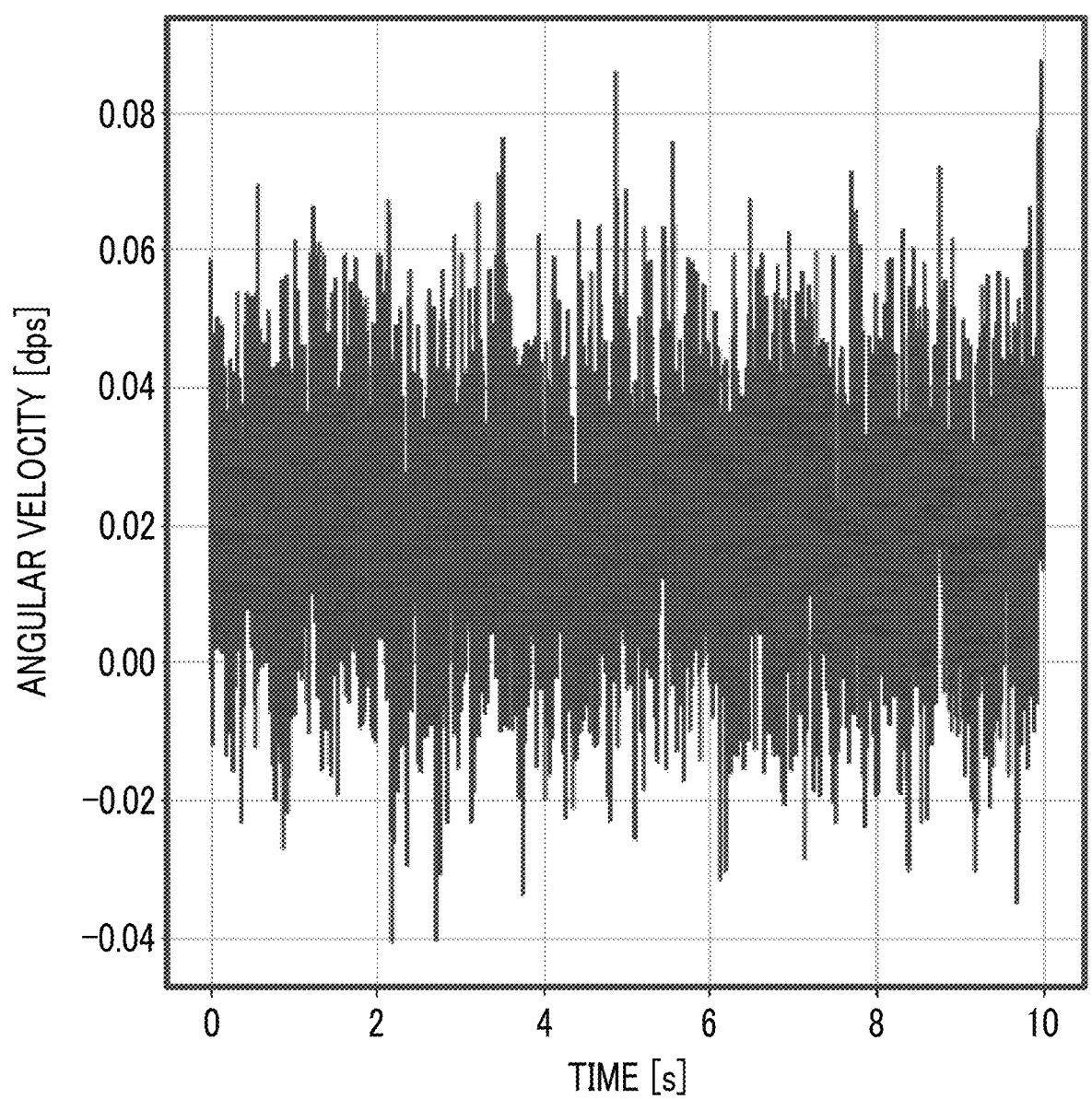
FIG. 33 is a diagram showing an example of an output signal of a gyro sensor in a stationary state.

FIG. 33 is a diagram showing an example of the output signal of the gyro sensor in the stationary state.

The drawing shows the output signal of the gyro sensor in a case where the offset is 0.02 [dps]. The unit [dps] means "degree per second".

Figure 34:
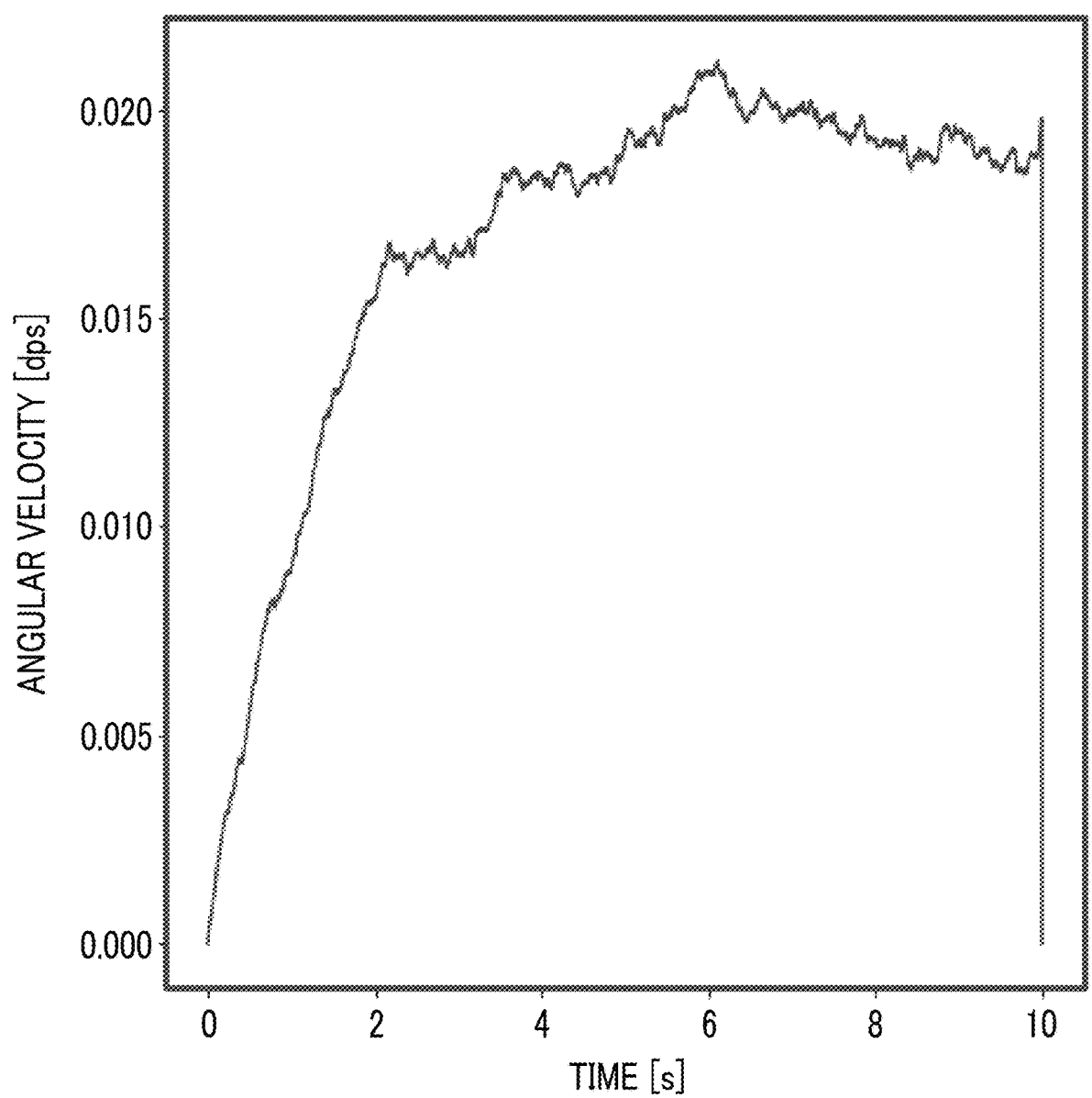
FIG. 34 is a diagram showing an extraction result of a first feature amount.

FIG. 34 is a diagram showing the extraction result of the first feature amount. That is, a result of extracting the amount of direct current component from the output signal of the gyro sensor shown in FIG. 33 is shown. In the present example, the cut-off frequency was set to 0.1 [Hz], and the output signal was subjected to low-pass filter processing to extract the first feature amount (amount of direct current component). As shown in the drawing, it can be seen that it is difficult to accurately feature the offset using only the first feature amount.

Figure 35:
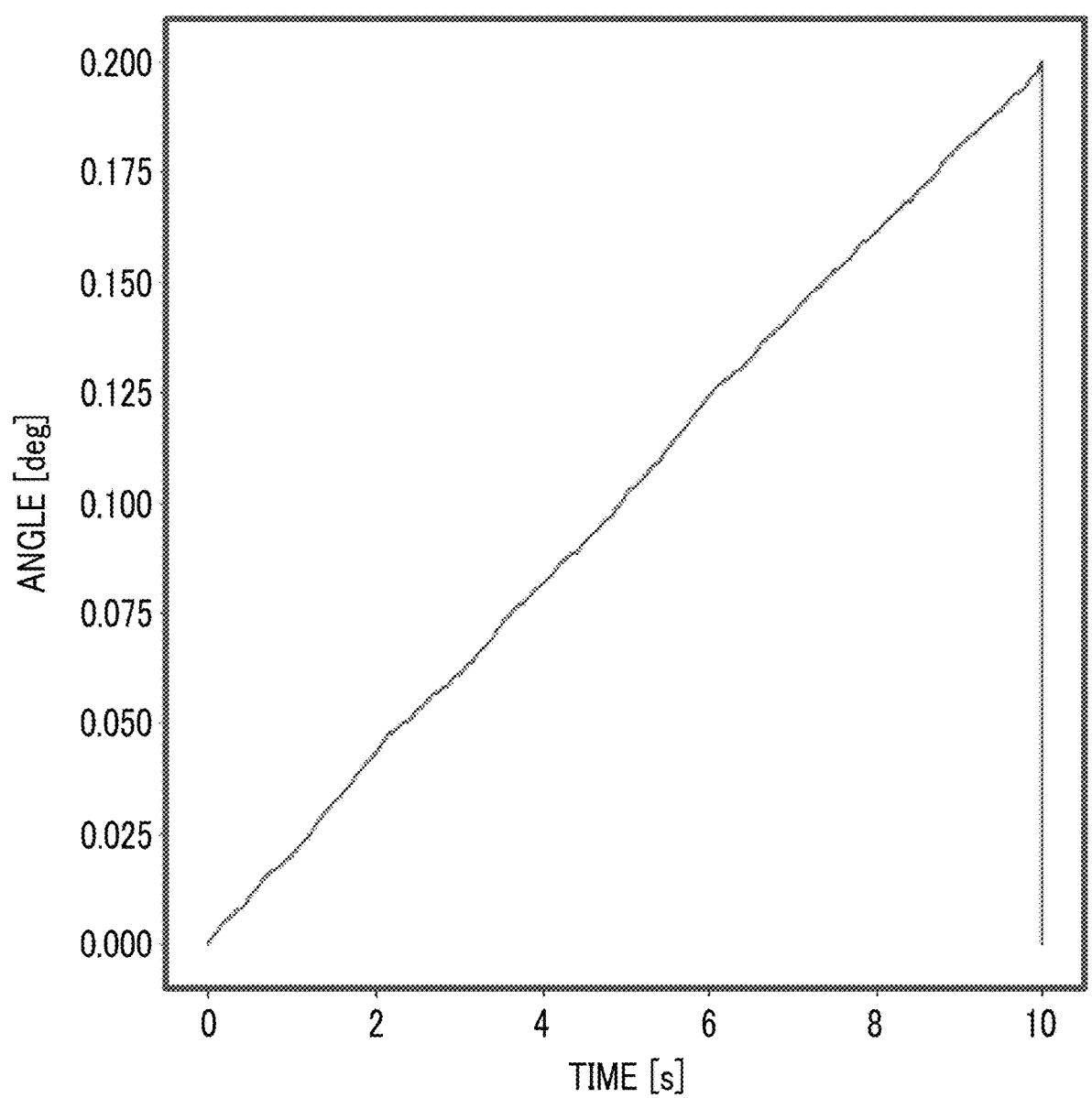
FIG. 35 is a diagram showing a calculation result of an integral value.

FIG. 35 is a diagram showing a calculation result of the integral value. That is, the result of integrating the output signal of the gyro sensor shown in FIG. 33 is shown. The angle is calculated by integrating the output signal of the gyro sensor. The term [Deg], which is a unit of an angle, means "degree". The second feature amount is calculated by calculating the gradient of the graph shown in the drawing.

Figure 36:
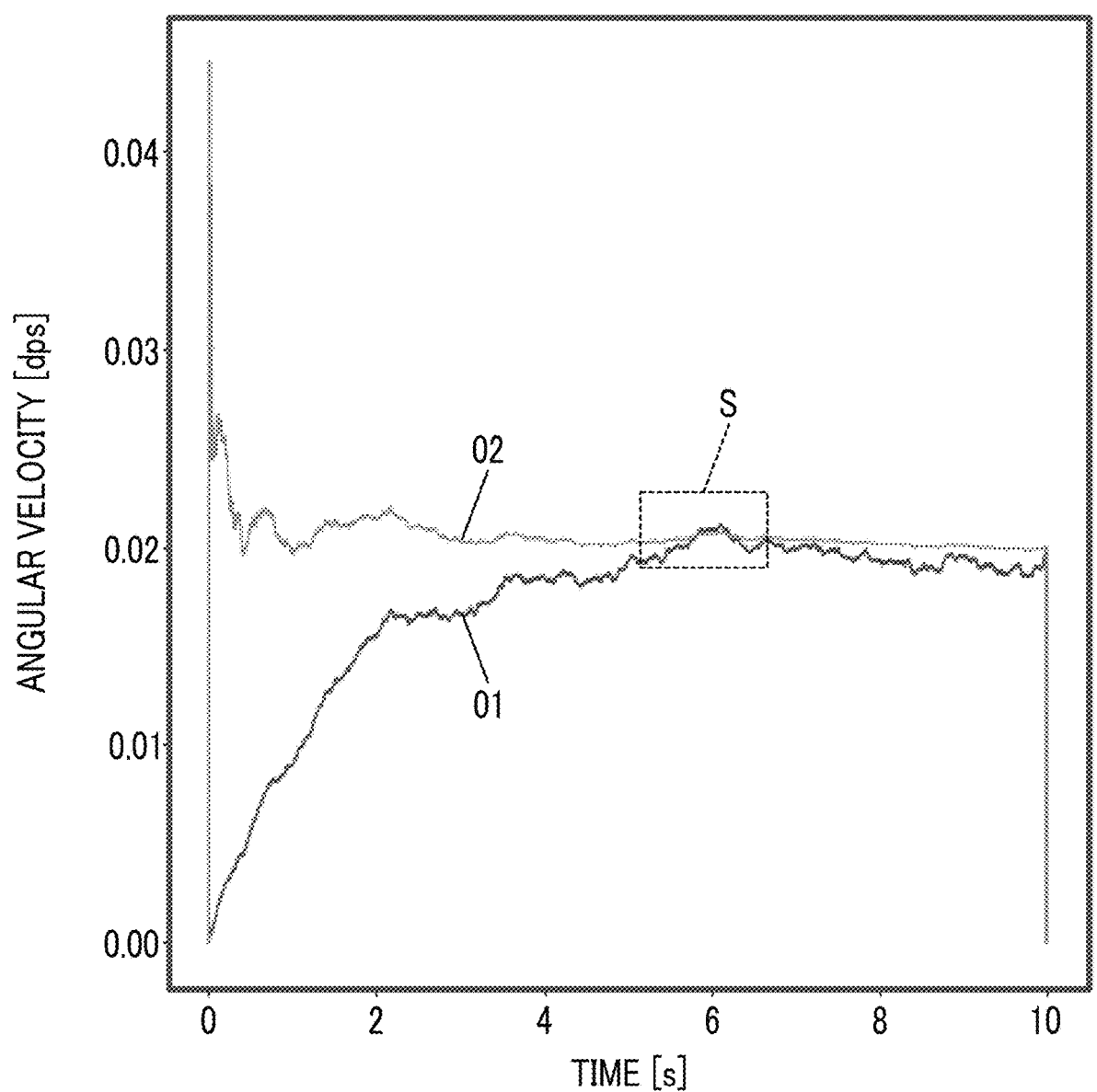
FIG. 36 is a diagram showing chronological change between the first feature amount and a second feature amount.

FIG. 36 is a diagram showing chronological change between the first feature amount and the second feature amount. In the drawing, the reference numeral O1 indicates a chronological change of the first feature amount. Further, the reference numeral O2 indicates a chronological change in the second feature amount.

As shown in the drawing, it can be observed that the offset can be accurately specified by comparing the first feature amount O1 with the second feature amount O2. That is, it can be observed that the offset can be accurately specified by detecting a state in which both thereof coincide with each other. The coincidence between both thereof can be determined by detecting that the absolute value of the difference between both thereof is equal to or less than the fourth threshold value continuously for the specified time or longer. For example, in FIG. 36, by detecting the state of the region S surrounded by the broken line, it is possible to detect that both thereof coincide with each other.

As described above, the second offset calculation processing can be performed in a case where the digital camera is in a stationary state. In such a case, the offset correction units 60A and 60B are provided with a function of a stationary state determination unit that determines the stationary state of the digital camera. The stationary state determination unit determines the stationary state on the basis of the output signals (output signals of the gyro sensor) of the first detection unit 20A and the second detection unit 20B. For example, the stationary state is determined by performing the low-pass filter processing or band-pass filter processing on the output signals of the first detection unit 20A and the second detection unit 20B after the first offset is subtracted therefrom. In a case where the signal after the filter processing is kept equal to or less than the fourth threshold value for a certain period of time, it is determined that the camera is in the stationary state.

Further, since the offset of the gyro sensor also fluctuates depending on the ambient temperature, the offset may be managed for each temperature. In such a case, in the case of calculating the offset, the temperature information is acquired and the calculated offset is stored for each temperature. Further, in a case of the offset correction, the correction processing is executed using the offset corresponding to the temperature.

Further, in the above-mentioned configuration, the offset is removed in two steps, but it is also possible to remove only the second offset.

Further, in a case where the second offset is calculated and removed from the signal as described above, the standard value of the offset including the accuracy at which the second offset is obtained. Then, each threshold value of the first to third threshold values is set on the basis of the standard value of the set offset.

Regarding the second offset, in addition to the calculation using the above-mentioned method, a method of estimating using a Kalman filter, a method of estimating by image processing, or the like can be adopted.

Other Embodiments (1) Apparatus to which Present Invention is Applied

In the above-mentioned embodiment, a case where the present invention is applied to a digital camera provided with a camera shake correction function is described as an example, but application of the present invention is not limited thereto. In addition, the present invention can be applied to various imaging apparatuses such as a video camera, a television camera, and a cine camera provided with the camera shake correction function.

Further, the imaging apparatus according to the present invention includes an imaging apparatus that is integrally incorporated into an imaging apparatus having a function other than imaging, as well as an imaging apparatus that is configured as a single unit. For example, an imaging apparatus, which is incorporated in a smartphone, a personal computer, or the like, is also included.

Further, for example, in a case where the interchangeable lens is provided with a camera shake correction function in a lens-interchangeable digital camera or the like, the present invention can be applied to the interchangeable lens. In such a case, for example, a system control unit (microcomputer or the like) provided in the interchangeable lens implements a function of the signal processing device. The interchangeable lens in such a case is an example of a lens apparatus.

Further, the camera shake correction is not limited to the so-called lens shift type, and the present invention can be applied to a case where an image sensor shift method is adopted. The image sensor shift method is the camera shake correction function of the method of correcting camera shake by moving the image sensor (imaging element) in accordance with camera shake. Furthermore, the present invention can also be applied to a case where so-called electronic camera shake correction is adopted.

(2) Blurring Detection Sensor

In the above-mentioned embodiment, the case of processing the output signal of the gyro sensor is described as an example. However, the application of the present invention is not limited thereto. The present invention can be applied to a case of processing an output signal of a sensor in which the output signal includes an offset, particularly, an output signal of a sensor from which it is difficult to remove the offset with the fixed value.

(3) Processor

A processor, which implements each function of the signal processing device, a central processing unit (CPU) as a general-purpose processor, a programmable logic device (PLD) that is a processor capable of changing a circuit configuration after manufacturing such as a field programmable gate array (FPGA), a dedicated electric circuit that is a processor having a circuit configuration designed exclusively for executing specific processing of an application specific integrated circuit (ASIC), or the like.

Each function of the signal processing device may be implemented by one of these various types of processors, or may be implemented by two or more processors of the same type or different types (for example, a plurality of FPGAs or a combination of a CPU and an FPGA).

Further, each function of the signal processing device may be implemented by one processor. As an example of implementing each function of the signal processing device with one processor, first, there is a form in which one processor is configured by a combination of one or more CPUs and software and this processor implements each function of the signal processing device. Secondly, there is a form in which a processor that implements the function of the entire signal processing device with one integrated circuit (IC) chip, as represented by a system on chip (SoC) or the like, is used.

As described above, each function of the signal processing device is implemented by using one or more of the above-mentioned various processors as a hardware structure.

Furthermore, the hardware structure of these various processors is more specifically an electric circuit in which circuit elements such as semiconductor elements are combined.

EXPLANATION OF REFERENCES

1: digital camera
10: imaging optical system
11: zoom lens
12: focus lens
13: correction lens
14: stop
15: zoom lens driving unit
16: focus lens driving unit
17: correction lens driving unit
17x: first driving unit
17y: second driving unit
18: stop driving unit
20: angular velocity detection unit
20A: first detection unit
20B: second detection unit
21A: gyro sensor
21B: gyro sensor
30: imaging element
40: main storage unit
41: digital signal processing unit
42: auxiliary storage unit
43: display unit
44: operating part
50: system control unit
60A: offset correction unit
60A1: first subtraction unit
60A2: second subtraction unit
60B: offset correction unit
70A: first correction amount operation unit
70B: second correction amount operation unit
71A: filter processing unit
71A1: high-pass filter 71A2: first elapsed time measurement unit
71A3: imaging information acquisition unit
71A4: second elapsed time measurement unit
71A5: output signal determination unit
71A6: output signal switching unit
71B: filter processing unit
72A: sensitivity correction unit
72B: sensitivity correction unit
73A: integration unit
73B: integration unit
74A: correction amount calculation unit
74B: correction amount calculation unit
80A: first driving control unit
80B: second driving control unit
90A: offset storage unit
90B: offset storage unit
100A: second offset operation unit
101A: first feature amount extraction unit
102A: integration unit
103A: second feature amount extraction unit
104A: second offset calculation unit
104A1: difference calculation unit
104A2: determination unit
104A3: calculation unit
110A: second offset storage control unit
Pit: pitch direction
Yaw: yaw direction
S1 to S2: method of determining signal to be output from filter processing unit in progress of exposure in primary imaging
S1 to S14: processing procedure in a case where high-pass signal is forcibly switched to non-high-pass signal in progress of exposure in primary imaging
S101 to S107: processing procedure of filter processing unit
S111 to S116: processing procedure for setting the HPF use flag during exposure of primary imaging
S211 to S218: processing procedure for calculation of second offset

What is claimed is:

1. A signal processing device that processes a signal which is output from a blurring detection sensor in progress of exposure of an imaging element, the signal processing device comprising
a processor,
wherein the processor is configured to perform:
processing of generating a second signal obtained by performing high-pass filter processing on a first signal which is output from the blurring detection sensor; and
processing of calculating an amount of blurring on the basis of the first signal or the second signal,
wherein in calculation of the amount of blurring, the processor switches a signal to be used for calculating the amount of blurring, on the basis of an exposure time of the imaging element and an elapsed time for calculation in the high-pass filter processing.

2. The signal processing device according to claim 1, wherein in the calculation of the amount of blurring based on the second signal, in a case where the calculation of the high-pass filter processing is reset, the processor switches from the second signal to the first signal and calculates the amount of blurring.

3. The signal processing device according to claim 1, wherein in a case where the exposure time is greater than a first threshold value and the elapsed time for calculation is equal to or less than a second threshold value, the processor calculates the amount of blurring on the basis of the first signal during a period from start of the exposure to a third threshold value, and calculates the amount of blurring on the basis of the second signal after elapse of the period from the start of the exposure to the third threshold value.

4. The signal processing device according to claim 1, wherein in a case where the exposure time is equal to or less than a first threshold value, the processor calculates the amount of blurring on the basis of the first signal.

5. The signal processing device according to claim 1, wherein in a case where the exposure time is greater than a first threshold value and the elapsed time for calculation is greater than a second threshold value, the processor calculates the amount of blurring on the basis of the second signal.

6. The signal processing device according to claim 3, wherein the first threshold value, the second threshold value, and the third threshold value are set on the basis of a cut-off frequency in the high-pass filter processing and an offset of the blurring detection sensor.

7. The signal processing device according to claim 6, wherein the processor further performs processing of calculating the offset on the basis of a signal which is output from the blurring detection sensor.

8. The signal processing device according to claim 7, wherein the processor is configured to perform: in the calculation of the offset,
processing of obtaining a direct current component of a signal which is output from the blurring detection sensor and calculating a first feature amount;
processing of obtaining a gradient of an accumulated integral value of a signal which is output from the blurring detection sensor and calculating a second feature amount; and
processing of calculating the offset on the basis of the first feature amount and the second feature amount.

9. An imaging apparatus comprising:
a blurring detection sensor that is provided in an apparatus body; and
the signal processing device according to claim 1 that processes a signal which is output from the blurring detection sensor.

10. A lens apparatus comprising:
a blurring detection sensor that is provided in an apparatus body; and
the signal processing device according to claim 1 that processes a signal which is output from the blurring detection sensor.

11. A signal processing method for processing a signal which is output from a blurring detection sensor in progress of exposure of an imaging element, the signal processing method comprising:
processing of generating a second signal obtained by performing high-pass filter processing on a first signal which is output from the blurring detection sensor; and
processing of calculating an amount of blurring on the basis of the first signal or the second signal,
wherein in the processing of calculating the amount of blurring, a signal to be used for calculating the amount of blurring is switched on the basis of an exposure time of the imaging element and an elapsed time for calculation in the high-pass filter processing.

12. A non-transitory, computer-readable tangible recording medium which records thereon a program that causes, when read by a computer, the computer to execute:

processing of acquiring a signal which is output from a blurring detection sensor in progress of exposure of an imaging element;
processing of generating a second signal obtained by performing high-pass filter processing on a first signal which is output from the blurring detection sensor; and
processing of calculating an amount of blurring on the basis of the first signal or the second signal,
wherein in the processing of calculating the amount of blurring, a signal to be used for calculating the amount of blurring is switched on the basis of an exposure time of the imaging element and an elapsed time for calculation in the high-pass filter processing.

* * * * *